US012808810B2

(12) United States Patent
Takeda

(10) Patent No.: US 12,808,810 B2
(45) Date of Patent: Nov. 24, 2026

(54) PATTERN INSPECTION METHOD AND PATTERN INSPECTION APPARATUS

(71) Applicant: NuFlare Technology, Inc., Yokohama (JP)

(72) Inventor: Masaya Takeda, Yokohama (JP)

(73) Assignee: NuFlare Technology, Inc., Yokohama (JP)

( * ) Notice: Subject to any disclaimer, the term of this patent is extended or adjusted under 35 U.S.C. 154(b) by 305 days.

(21) Appl. No.: 18/643,105

(22) Filed: Apr. 23, 2024

(65) Prior Publication Data

US 2024/0377335 A1 Nov. 14, 2024

(30) Foreign Application Priority Data

May 11, 2023 (JP) ................................ 2023-078824

(51) Int. Cl.
*G01N 21/88* (2006.01)
*G01N 21/956* (2006.01)

(52) U.S. Cl.
CPC ... *G01N 21/8806* (2013.01); *G01N 21/95607* (2013.01); *G01N 2021/95676* (2013.01)

(58) Field of Classification Search
None
See application file for complete search history.

(56) References Cited

U.S. PATENT DOCUMENTS 7,126,681 B1 * 10/2006 Chen .................... G01N 21/956 356/237.4
2012/0081538 A1 * 4/2012 Ogawa ................. G01N 21/956 348/87
2013/0250095 A1 * 9/2013 Inoue .................... G06T 7/0004 348/94
2018/0306733 A1 * 10/2018 Nakashima ...... G01N 21/95607
2023/0215770 A1 * 7/2023 Kobashi .............. H10P 72/0442 438/14

FOREIGN PATENT DOCUMENTS

JP 2012-68321 A 4/2012
JP 2012-78164 A 4/2012
JP 2017-129634 A 7/2017

* cited by examiner

*Primary Examiner* — Amandeep Saini
*Assistant Examiner* — Caroline Tabancay Duffy
(74) *Attorney, Agent, or Firm* — Oblon, McClelland, Maier & Neustadt, L.L.P.

(57) ABSTRACT

According to one aspect of the present invention, a method includes scanning wherein the scanning includes: holding, by using a stage height at which a pattern formation surface becomes a focus height position at a position near a scanning start position of a inspection region adjacent to an end of the non-inspection region in the scanning direction, a stage height position during scanning of the non-inspection region at the stage height at which the pattern formation surface becomes the focus height position at the position near the scanning start position; and performing, when the inspection region adjacent to the end of the non-inspection region in the scanning direction is scanned with the inspection light, autofocus control of adjusting a height position to the focus height position by starting the height position of the stage from the held stage height position and variably controlling the height position of the stage.

10 Claims, 9 Drawing Sheets

PATTERN INSPECTION METHOD AND PATTERN INSPECTION APPARATUS

CROSS-REFERENCE TO RELATED APPLICATION

This application is based upon and claims the benefit of priority from prior Japanese Patent Application No. 2023-078824 filed on May 11, 2023 in Japan, the entire contents of which are incorporated herein by reference.

BACKGROUND OF THE INVENTION

Field of the Invention

One aspect of the present invention relates to a pattern inspection method and a pattern inspection apparatus. For example, the present invention relates to an apparatus that inspects pattern defects of an exposure mask used for semiconductor manufacturing and autofocus control of the apparatus.

Related Art

In recent years, a circuit line width required for a semiconductor element has been getting narrower with higher integration and larger capacity of a large scale integration (LSI) circuit. These semiconductor elements are manufactured by using an original pattern (also referred to as a mask or a reticle. Hereinafter, collectively referred to as a mask) on which a circuit pattern is formed and exposing and transferring the pattern onto a wafer using a reduction projection exposure apparatus called a stepper so as to form a circuit.

In addition, improvement of yield is essential for the manufacture of LSI requiring large manufacturing costs. One of the major factors for lowering the yield is a pattern defect of a mask used when an ultrafine pattern is exposed and transferred on a semiconductor wafer by a photolithography technique. In recent years, along with miniaturization of LSI pattern dimensions formed on the semiconductor wafer, dimensions to be detected as pattern defects have become extremely small. Therefore, there is a need to increase accuracy of a pattern inspection apparatus that inspects a defect of a transfer mask used for LSI manufacturing.

Examples of an inspection method include “die to die inspection” that compares pieces of optical image data obtained by imaging the same pattern at different locations on the same mask, and “die to database inspection” that inputs, to an inspection apparatus, writing data (design data) converted into an apparatus input format for a writing apparatus to input when writing (“drawing”) a pattern using pattern-designed CAD data as a mask, generates a reference image based on the writing data, and compares the reference image with an optical image serving as measurement data obtained by imaging the pattern.

In such an inspection apparatus, it is necessary to clearly collect a pattern image on a target object to be inspected such as a mask. However, since there is a finite focal depth in an optical system of the inspection apparatus, it is necessary to keep the inspection surface of the target object to be inspected within the focal depth of the optical system during the inspection. In other words, it is required to maintain contrast of a captured image within an allowable range. Therefore, in the inspection apparatus, in addition to the inspection optical system for image capturing, an autofocus mechanism that detects displacement of an inspection object in the height direction with respect to the inspection optical system and adjusts the height position is adopted.

The target object to be inspected has a non-inspection region in which no pattern is formed around an inspection region in which the pattern is formed. In pattern inspection, scanning is started from the non-inspection region, proceeds to the inspection region, and continues up to another non-inspection region on the opposite side of the previous non-inspection region. During the pattern inspection, autofocus control is performed.

Here, there is a case in which a target object to be inspected having a large step formed between a surface of the non-inspection region and a surface of the inspection region is inspected. In such a case, when a scanning position enters the inspection region from the non-inspection region, the autofocus control does not catch up with the large step, and there is a problem that an image captured immediately after entering the inspection region is blurred.

There is disclosed a method of determining whether a target object to be inspected having a large step formed between an inspection region surface and a non-inspection region surface is an inspection region or a non-inspection region, driving an autofocus mechanism in the inspection region, and stopping the autofocus mechanism immediately before a scanning position enters the non-inspection region (refer to, for example, JP-A-2012-078164).

However, in the target object to be inspected, a plurality of inspection regions may be arranged with the non-inspection region interposed therebetween in a scanning direction at the time of inspection. In such a target object to be inspected, a focus height position immediately before switching from the inspection region to the non-inspection region and a focus height position immediately after switching from the non-inspection region to the next inspection region do not constantly coincide with each other, for example, when the target object to be inspected is deflected. Therefore, simply stopping the autofocus mechanism immediately before the scanning position enters the non-inspection region may not solve a problem that an image captured immediately after the scanning position enters the next inspection region is blurred.

BRIEF SUMMARY OF THE INVENTION

According to one aspect of the present invention, a pattern inspection method includes:

- scanning, with inspection light, a plurality of inspection regions and a non-inspection region interposed between the plurality of inspection regions in a predetermined direction using a target object to be inspected, the target object including the plurality of inspection regions each having a figure pattern formed therein and the non-inspection region interposed between the plurality of inspection regions;
- capturing an optical image of the target object to be inspected by receiving, using a sensor through an inspection optical system, a light transmitted through or reflected by the target object to be inspected irradiated with the inspection light; and comparing, using a reference image, a captured optical image with the reference image and outputting a comparison result,
- wherein the scanning includes:
- performing, when an inspection region, of the plurality of inspection regions, on a front side of the non-inspection region in a scanning direction is scanned with the inspection light, autofocus control of variably controlling a height position of a stage on which the target object to be inspected placed thereon so as to adjust a height position of a pattern formation surface to a desired focus height position at each position of the inspection region;

holding, by using a stage height at which a pattern formation surface becomes a focus height position at a position near a scanning start position of a inspection region, of the plurality of inspection regions, adjacent to an end of the non-inspection region in the scanning direction, a stage height position during scanning of the non-inspection region at the stage height at which the pattern formation surface becomes the focus height position at the position near the scanning start position when the non-inspection region is scanned with the inspection light; and performing, when the inspection region adjacent to the end of the non-inspection region in the scanning direction is scanned with the inspection light, autofocus control of adjusting a height position of the pattern formation surface of the inspection region adjacent to the end of the non-inspection region in the scanning direction to the focus height position by starting the height position of the stage from the held stage height position and variably controlling the height position of the stage.

According to another aspect of the present invention, a pattern inspection apparatus includes:

a movable stage configured to allow a target object to be inspected to be placed thereon, the target object including a plurality of inspection regions each having a figure pattern formed thereon and a non-inspection region interposed between the plurality of inspection regions;

a drive mechanism configured to move a height position of the stage;

an illumination optical system configured to illuminate the target object to be inspected with an inspection light;

a sensor configured to capture an optical image of the target object to be inspected by receiving a light transmitted through or reflected by the target object to be inspected irradiated with the inspection light;

an inspection optical system configured to guide the light transmitted through or reflected by the target object to be inspected to the sensor;

an autofocus mechanism configured to perform, when the plurality of inspection regions and the non-inspection region interposed between the plurality of inspection regions are scanned with the inspection light in a predetermined direction, autofocus control of variably controlling a height position of the stage so as to adjust a height position of a pattern formation surface to a desired focus height position at each position of the plurality of inspection regions; and a comparison circuit configured to compare, using a reference image, a captured optical image with the reference image, wherein the autofocus mechanism includes:

a storage device configured to store a stage height at which the pattern formation surface becomes the focus height position at a position near a scanning start position of an inspection region, of the plurality of inspection regions, adjacent to an end of the non-inspection region in a scanning direction; and an autofocus processing circuit configured to hold, when the non-inspection region is scanned with the inspection light, a stage height position during scanning of the non-inspection region at the stage height at which the pattern formation surface becomes the focus height position at the position near the scanning start position, and to adjust, when the inspection region adjacent to the end of the non-inspection region in the scanning direction is scanned with the inspection light, the height position of the pattern formation surface of the inspection region adjacent to the end of the non-inspection region in the scanning direction to a focus height position by starting the height position of the stage from a held stage height position and variably controlling the height position of the stage.

DETAILED DESCRIPTION OF THE INVENTION

Hereinafter, an embodiment provides a method and an apparatus for the method capable of suppressing or reducing blurring of an image captured immediately after a scanning position enters an inspection region even when a large step that an autofocus mechanism hardly follows is formed between the inspection region and a non-inspection region at the time of performing inspection of a target object to be inspected, in which the target object has a plurality of inspection regions arranged therein and the non-inspection region interposed between the inspection regions.

First Embodiment

Figure 1:
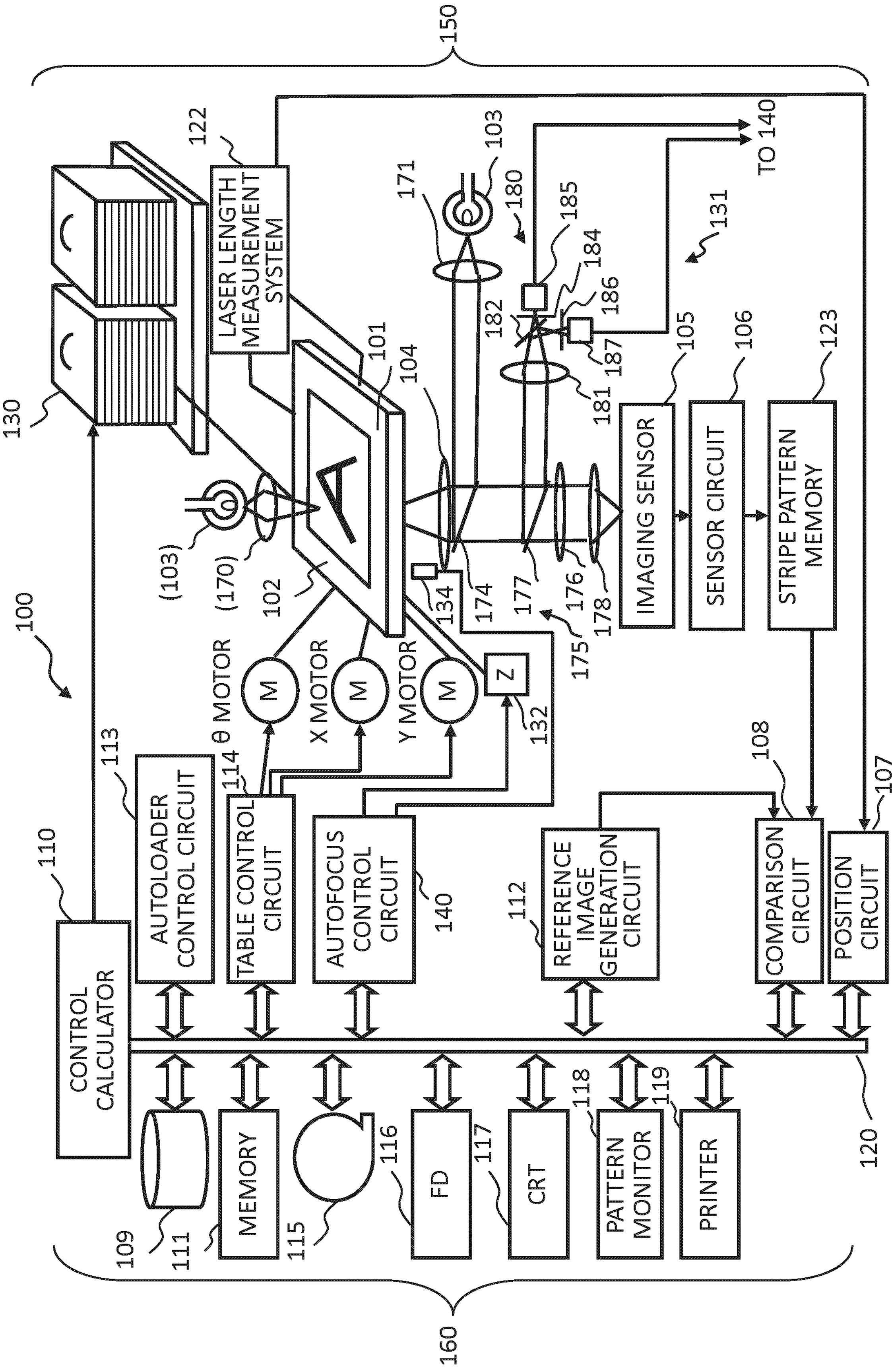
FIG. 1 is a configuration diagram illustrating a configuration of a pattern inspection apparatus according to a first embodiment.

FIG. 1 is a configuration diagram illustrating a configuration of a pattern inspection apparatus according to a first embodiment; In FIG. 1, an inspection apparatus 100 that inspects a defect of a pattern formed on a target object to be inspected such as a mask includes an optical image acquisition mechanism 150 and a control system circuit 160.

The optical image acquisition mechanism 150 includes a light source 103, a reflection illumination optical system 171, a movably arranged XYθ table 102, a magnifying optical system 104, a beam splitter 174, a beam splitter 177, a collimator lens 176, an imaging optical system 178, an autofocus mechanism 131, an imaging sensor 105, a sensor circuit 106, a stripe pattern memory 123, a laser length measurement system 122, and an autoloader 130. In a case where transmission inspection using transmitted light is performed, a transmitted illumination optical system 170 is further disposed. When only reflection inspection using reflected light is performed without performing the transmission inspection, the transmitted illumination optical system 170 may be omitted. In a case where both the transmission inspection and the reflection inspection are simultaneously performed, an imaging sensor (not illustrated) may be further added, an image for the reflection inspection may be captured by the imaging sensor 105, and an image for the transmission inspection may be captured by the added imaging sensor.

The autofocus mechanism 131 includes an autofocus optical system 180, a light amount sensor 185 (first light amount sensor), a light amount sensor 187 (second light amount sensor), a Z drive mechanism 132, and a position sensor 134. When a target object to be inspected 101 is irradiated with inspection light, the autofocus optical system 180 allows light transmitted through or reflected by the target object to be inspected to pass through the magnifying optical system 104 and the beam splitter 174, and light split by the beam splitter 177 to be incident thereon. In addition, light having passed through the beam splitter 177 is incident on the imaging sensor 105 through the imaging optical system 178.

The autofocus optical system 180 includes an imaging optical system 181, a beam splitter 182, a slit plate 184, and a slit plate 186. The autofocus optical system 180 guides the light transmitted through or reflected by the target object to be inspected to the light amount sensor 185 and the light amount sensor 187. The beam splitter 182 is disposed in front of a focal position. The slit plate 184 is disposed at a front focal position (front pin position) and receives light transmitted through the beam splitter 182. The light amount sensor 185 measures a light amount passing through the slit plate 184 disposed at the front focal position (front pin position). The slit plate 186 is disposed at a rear focal position (rear pin position) and receives light split by the beam splitter 182. The light amount sensor 187 measures a light amount passing through the slit plate 186 disposed at the rear focal position (rear pin position).

On the XYθ table 102, the target object to be inspected 101 conveyed from the autoloader 130 is disposed. An example of the target object to be inspected 101 includes a photomask for exposure for transferring a pattern to a semiconductor substrate such as a wafer. Further, a figure pattern to be inspected is formed on the photomask. The target object to be inspected 101 is not limited to the photomask. In addition, for example, the target object to be inspected 101 is disposed on the XYθ table 102 in a state in which a pattern formation surface thereof faces downwards. This is an example of a stage of the XYθ table 102.

A line sensor or a two-dimensional sensor is used as the imaging sensor 105. For example, a time delay integration (TDI) sensor is preferably used. The TDI sensor has a plurality of photosensor elements arranged two-dimensionally. When each photosensor element captures an image, a predetermined image accumulation time is set. In the TDI sensor, outputs of the plurality of photosensor elements arranged in a scanning direction are integrated and output. The plurality of photosensor elements arranged in the scanning direction image the same pixel while shifting the time according to movement of the XYθ table 102. When the line sensor is used, the plurality of photosensor elements are arranged in a direction orthogonal to the scanning direction.

In the control system circuit 160, a control calculator 110 that entirely controls the inspection apparatus 100 is connected, via a bus 120, to a position circuit 107, a comparison circuit 108, a reference image generation circuit 112, an autoloader control circuit 113, a table control circuit 114, an autofocus control circuit 140, a magnetic disk drive 109, a memory 111, a magnetic tape device 115, a flexible disk device (FD) 116, a CRT 117, a pattern monitor 118, and a printer 119. Further, the sensor circuit 106 is connected to the stripe pattern memory 123, and the stripe pattern memory 123 is connected to the comparison circuit 108. Additionally, the reference image generation circuit 112 is connected to the comparison circuit 108.

The output of the position sensor 134 is connected to the autofocus control circuit 140. Further, the outputs of the light amount sensors 185 and 187 are connected to the autofocus control circuit 140.

It is noted that a series of "circuits" such as the position circuit 107, the comparison circuit 108, the reference image generation circuit 112, the autoloader control circuit 113, the table control circuit 114, and the autofocus control circuit 140 includes a processing circuit. Such a processing circuit includes an electric circuit, a computer, a processor, a circuit board, a quantum circuit, a semiconductor device, or the like. Each circuit may be configured using the same processing circuit (one processing circuit), or different processing circuits (separate processing circuits) may be used. For example, a series of "circuits" such as the position circuit 107, the comparison circuit 108, the reference image generation circuit 112, the autoloader control circuit 113, the table control circuit 114, and the autofocus control circuit 140 may be configured and executed by the control calculator 110. Input data necessary for the position circuit 107, the comparison circuit 108, the reference image generation circuit 112, the autoloader control circuit 113, the table control circuit 114, and the autofocus control circuit 140 or a result of calculation is stored in a memory (not illustrated) in each circuit or the memory 111 each time. Input data necessary for the control calculator 110 or a calculation result is stored in a memory (not illustrated) in the control calculator 110 or the memory 111 each time. A program for executing a processor or the like may be recorded in a record carrier body storing therein a processing procedure in a computer readable and executable form, such as the magnetic disk drive 109, the magnetic tape device 115, the FD 116, or a read only memory (ROM).

In the inspection apparatus 100, a reflection inspection optical system and/or a transmission inspection optical system is mounted as an inspection optical system 175. The light source 103, the reflection illumination optical system 171, the beam splitter 174, the magnifying optical system 104, the XYθ table 102, the collimator lens 176, and the imaging optical system 178 form a reflection inspection optical system having a high magnification. Alternatively, the light source 103, the transmitted illumination optical system 170, the XYθ table 102, the magnifying optical system 104, the collimator lens 176, and the imaging optical system 178 form a transmission inspection optical system having a high magnification.

Further, the XYθ table 102 is driven by the table control circuit 114 under the control of the control calculator 110. The XYθ table 102 is movable by a drive system such as a three-axis (X-Y-θ) motor that drives in the X direction, the Y direction, and the θ direction. As an X motor, a Y motor, and a θ motor, for example, a step motor can be used. The XYθ table 102 is movable in the horizontal direction and the rotational direction by motors of XYθ axes. The XYθ table 102 is an example of a stage. Then, the scanning position (imaging position or optical position) of the target object to be inspected 101 disposed on the XYθ table 102 is measured by the laser length measurement system 122 and is supplied to the position circuit 107. In addition, conveyance processing of the target object to be inspected 101 from the autoloader 130 to the XYθ table 102 and conveyance processing of the target object to be inspected 101 from the XYθ table 102 to the autoloader 130 are controlled by the autoloader control circuit 113.

Further, the XYθ table 102 is driven in the z direction by the Z drive mechanism 132 controlled by the autofocus control circuit 140. As the Z drive mechanism 132, for example, a piezoelectric element or a step motor is preferably used. Additionally, the height position of the surface of the target object to be inspected 101 (for example, pattern formation surface) is measured by the position sensor 134, and the measurement result is output to the autofocus control circuit 140.

Writing data (design data) serving as a basis of pattern formation of the target object to be inspected 101 is input from the outside of the inspection apparatus 100 and is stored in the magnetic disk drive 109. A plurality of figure patterns are defined in the writing data, and each figure pattern is usually formed by a combination of a plurality of element figures. It is noted that there may be a figure pattern including one figure. A corresponding pattern is formed on the target object to be inspected 101 based on each figure pattern defined in the writing data.

Here, in FIG. 1, components necessary for describing the first embodiment are described. It goes without saying that the inspection apparatus 100 may normally include other necessary configurations.

Figure 2:
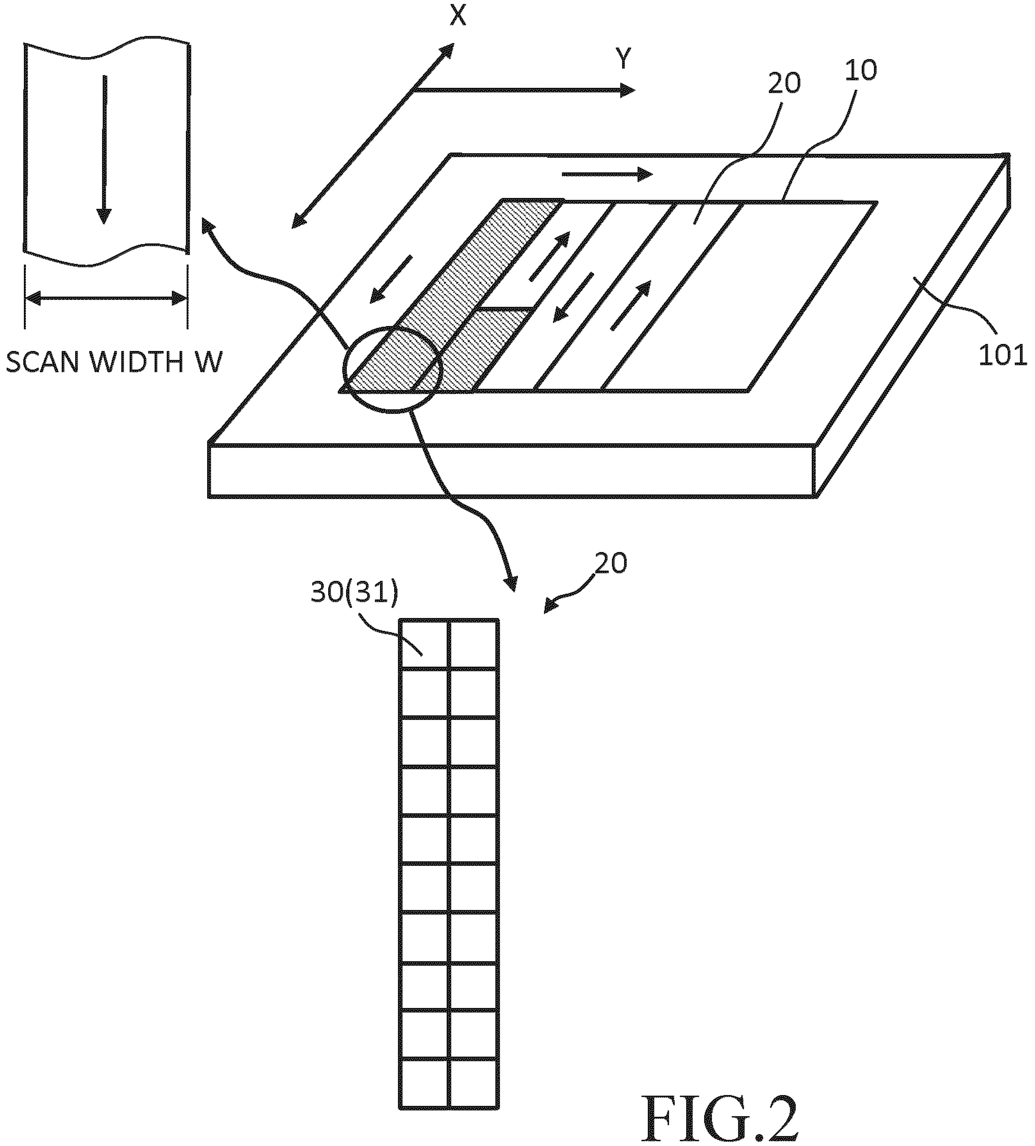
FIG. 2 is a conceptual diagram illustrating an inspection region according to the first embodiment.

FIG. 2 is a conceptual diagram illustrating an inspection region according to the first embodiment; As illustrated in FIG. 2, an inspection region 10 of the target object to be inspected 101 (in a case where there are a plurality of inspection regions, a circumscribed rectangular region of the entire plurality of inspection regions is illustrated) is virtually divided into a plurality of strip-shaped inspection stripes 20 having a scan width W of the imaging sensor 105, for example, in the Y direction. Then, the inspection apparatus 100 acquires an image (stripe region image) for each inspection stripe 20. For each of the inspection stripes 20, an image of a figure pattern disposed in the inspection stripe 20 is captured in the longitudinal direction (X direction) of the stripe region using laser light (inspection light). In order to prevent missing of an image, the plurality of inspection stripes 20 are preferably set such that adjacent inspection stripes 20 overlap each other with a predetermined margin width therebetween.

An optical image is acquired while the imaging sensor 105 relatively continuously moves in the X direction by movement of the XYθ table 102. The imaging sensor 105 continuously captures an optical image having the scan width W, as illustrated in FIG. 2. In the first embodiment, after capturing an optical image in one inspection stripe 20, the imaging sensor 105 continuously captures an optical image having the scan width W while moving to the position of the next inspection stripe 20 in the Y direction and then moving in the opposite direction. That is, imaging is repeatedly performed in the forward (FWD)-and-backward (BWD) direction in which a forward path and a backward path are in opposite directions.

Additionally, in actual inspection, the stripe region image of each inspection stripe 20 is divided into images (frame images 31) of a plurality of rectangular frame regions 30, as illustrated in FIG. 2. Then, inspection is performed for each frame image 31 in the frame region 30. For example, the frame image 31 is divided into a size of 512×512 pixels. Therefore, a reference image to be compared with the frame image 31 of the frame region 30 is similarly generated for each frame region 30.

When the image of each inspection stripe 20 is acquired, the optical image acquisition mechanism 150 captures the optical image of the target object to be inspected in the preset frame region 30 by receiving light transmitted through or reflected by the target object to be inspected 101 irradiated with inspection light at the set target object surface height position in a state in which the target object to be inspected 101 is placed on the XYθ table 102 by using the imaging sensor 105 through the inspection optical system 175. Specifically, an operation is performed as follows.

The optical image acquisition mechanism 150 scans (scans) the inspection stripe 20 including the frame region 30 set in advance with laser light (inspection light), and captures a stripe region image by the imaging sensor 105. Specifically, an operation is performed as follows. The XYθ table 102 is moved to a position at which the target inspection stripe 20 can be imaged. In the transmission inspection, the pattern formed on the target object to be inspected 101 is irradiated with laser light (for example, DUV light) having a wavelength in an ultraviolet region or less to be inspection light from the appropriate light source 103 through the transmitted illumination optical system 170. In other words, the transmitted illumination optical system 170 illuminates the target object to be inspected on which the pattern is formed. Light transmitted through the target object to be inspected 101 is imaged as an optical image on the imaging sensor 105 (an example of the sensor) by the imaging optical system 178 through the magnifying optical system 104 and the collimator lens 176, and is incident thereon. In other words, the inspection optical system 175 guides the light transmitted through the target object to be inspected to the imaging sensor 105.

Alternatively, in the reflection inspection, for the pattern formed on the target object to be inspected 101, the beam splitter 174 is irradiated with laser light (for example, DUV light) having a wavelength in the ultraviolet region or less to be the inspection light from the appropriate light source 103 by the reflection illumination optical system 171. The emitted laser light is reflected by the beam splitter 174, and is emitted to the target object to be inspected 101 by the magnifying optical system 104. The light reflected from the target object to be inspected 101 passes through the magnifying optical system 104, the beam splitter 174, and the collimator lens 176, is imaged as an optical image on the imaging sensor 105 by the imaging optical system 178, and is incident thereon. In other words, the inspection optical system 175 guides the light reflected from the target object to be inspected to the imaging sensor 105.

The imaging sensor 105 receives the light transmitted through or reflected by the target object to be inspected 101 irradiated with the inspection light, thereby capturing the optical image of the target object to be inspected 101.

The image of the pattern formed on the imaging sensor 105 is photoelectrically converted by each photosensor element of the imaging sensor 105, and is further subjected to analog/digital (A/D) conversion by the sensor circuit 106. Then, data of a pixel value of the inspection stripe 20 to be measured is stored in the stripe pattern memory 123. The measurement data (pixel data) is, for example, 8-bit unsigned data, and expresses gradation (light amount) of brightness of each pixel.

As described above, the inspection apparatus 100 includes, in addition to the inspection optical system 175 (the reflection inspection optical system or/and the transmission inspection optical system), the autofocus mechanism 131 that detects the displacement of the target object to be inspected 101 in the height direction with respect to the inspection optical system 175 and adjusts the height position of the target object to be inspected 101 to the focus position.

The autofocus mechanism 131 variably controls the height position of the XYθ table 102 (stage) during acquisition of the image of the inspection stripe 20, thereby performing autofocus control of adjusting the height position of the pattern formation surface to a desired focus height position at each position of a target stripe region. In other words, when a plurality of inspection regions 12 and a non-inspection region 14 interposed between the inspection regions to be described later are scanned in a predetermined direction with the inspection light, the autofocus mechanism 131 variably controls the height position of the XYθ table 102 (stage) so as to perform autofocus control of adjusting the height position of the pattern formation surface to a desired focus height position at each position of the plurality of inspection regions 12. The height position of the XYθ table 102 (stage) is moved by the Z drive mechanism 132.

Here, as pattern miniaturization has progressed, the wavelength of the inspection light has been shortened, and the focal depth of the inspection optical system 175 has become shallower accordingly. Therefore, conventionally, accuracy of an independent measurement system installed in the vicinity of the inspection optical system is sufficient. However, unless in-situ measurement using the inspection optical system itself is performed, various fluctuation factors (dependency on temperature/mechanical deformation) of the inspection optical system cannot be detected and, as such, high-accuracy focus adjustment cannot be performed.

Therefore, in the autofocus mechanism 131, when the target object to be inspected 101 is irradiated with the inspection light (DUV light), the height position of the surface of the target object to be inspected 101 is adjusted to the focus position using light amounts measured at the front focal position and the rear focal position of the light transmitted through or reflected by the target object to be inspected 101. In the example of FIG. 1, the height position of the surface of the target object to be inspected 101 is adjusted to the focus position using the light amounts measured at the front focal position and the rear focal position of the light reflected from the target object to be inspected 101. Specifically, the autofocus mechanism 131 uses a confocal optical system method so as to adjust the height position of the surface of the target object to be inspected 101 to a focus position at which a value (autofocus signal) obtained by dividing a difference between a light amount signal AF-F at the front focal position measured by the light amount sensor 185 and a light amount signal AF-R at the rear focal position measured by the light amount sensor 187 with respect to the height position of the pattern formation surface of the target object to be inspected by a sum becomes a predetermined value (for example, zero). In a case where there is a shift between the focus height position for the imaging sensor 105 and the focus height position in the autofocus mechanism 131, the height position of the surface of the target object to be inspected 101 is adjusted to a position obtained by adding an offset corresponding to the shift. Hereinafter, a specific description will be given.

When capturing the optical image of each of the inspection stripes 20 described above, the autofocus mechanism 131 adjusts the target object surface height position of the target object to be inspected 101, which may vary with movement of the XYθ table 102 in the horizontal direction, to a target object surface height position corresponding to a desired autofocus signal (for example, zero) in a state in which the target object to be inspected 101 is placed on the XYθ table 102. Specifically, an operation is performed as follows.

The light transmitted through or reflected by the target object to be inspected 101 passes through the magnifying optical system 104 and the beam splitter 174, and a part thereof is partially split by the beam splitter 177. The split light enters the autofocus optical system 180. Then, as described above, the light amount sensor 185 measures the light amount at the front focal position (front pin position). The light amount sensor 187 measures the light amount at the rear focal position (rear pin position). The light amounts measured by the light amount sensors 185 and 187 are output to the autofocus control circuit 140.

The autofocus control circuit 140 inputs the light amount at the front pin position and the light amount at the rear pin position from the light amount sensors 185 and 187, and stores the light amounts in a storage device 51.

An autofocus signal calculation unit 62 inputs the light amount at the front pin position and the light amount at the rear pin position from the storage device 51, and calculates an autofocus signal (AF signal).

An autofocus processing unit 64 controls the Z drive mechanism 132 so that the autofocus signal to be calculated becomes a desired autofocus signal (for example, zero).

As described above, autofocus control is executed while the image is captured (while the inspection region is scanned).

Figure 3:
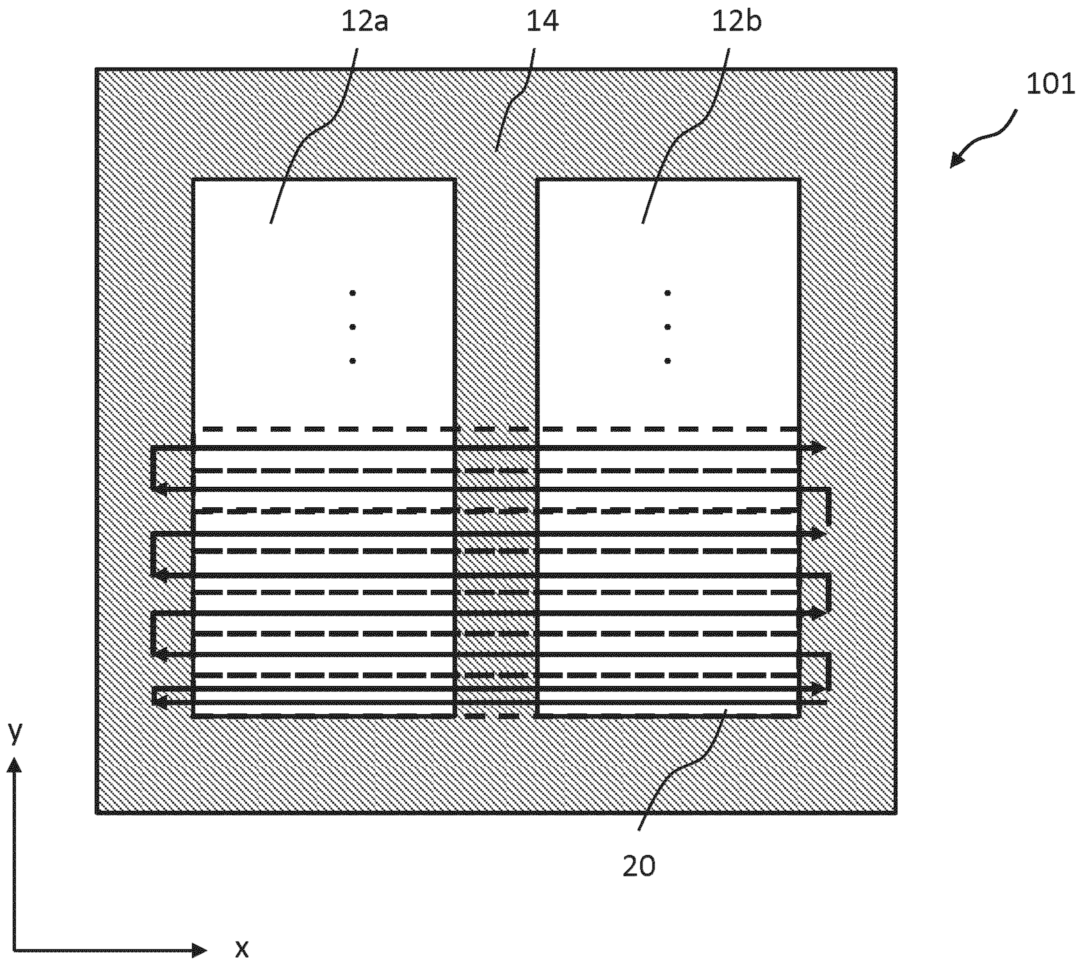
FIG. 3 is a top view illustrating an example of a target object to be inspected according to the first embodiment.
Figure 4:
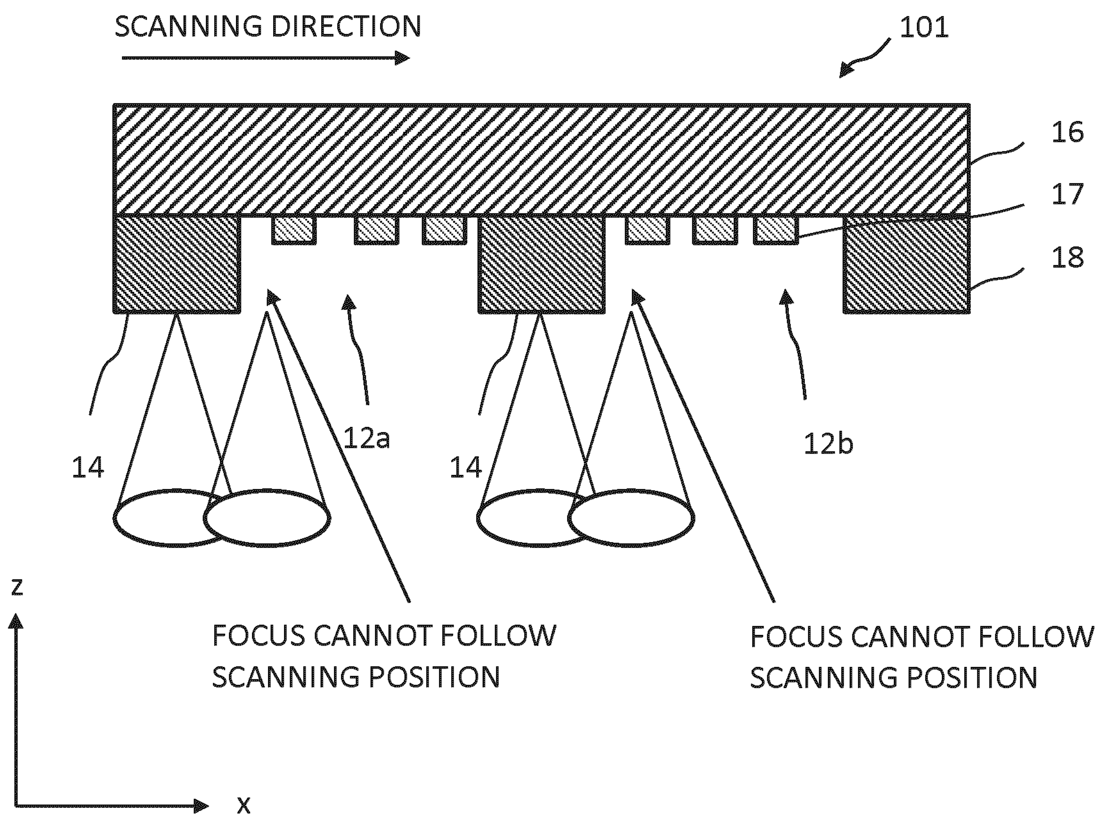
FIG. 4 is a cross-sectional view illustrating an example of the target object to be inspected according to the first embodiment.

FIG. 3 is a top view illustrating an example of a target object to be inspected according to the first embodiment;

FIG. 4 is a cross-sectional view illustrating an example of the target object to be inspected according to the first embodiment; As illustrated in FIGS. 3 and 4, a plurality of inspection regions 12 are arranged in the target object to be inspected 101 according to the first embodiment. A figure pattern is arranged in each inspection region 12. In addition to the case in which the same figure pattern is arranged in each inspection region 12, different figure patterns may be arranged. The plurality of inspection regions 12 are arranged with the non-inspection region 14 interposed between the inspection regions 12. In addition, a region around the entire plurality of inspection regions 12 is also a non-inspection region. In other words, each inspection region 12 is surrounded by the non-inspection region 14. Although a pattern is not generally formed in the non-inspection region 14, a pattern may be formed therein. In the examples of FIGS. 3 and 4, for example, a case in which two inspection regions 12*a* and 12*b* are formed with the non-inspection region 14 interposed therebetween is illustrated. In the case of capturing an optical image of the target object to be inspected 101, as described in FIG. 2, the circumscribed rectangular region of the entire plurality of inspection regions 12 is divided into, for example, a plurality of inspection stripes 20 in the y direction. Alternatively, a circumscribed rectangular region of the entire plurality of inspection regions 12 arranged in at least the x direction is divided into, for example, a plurality of inspection stripes 20 in the y direction.

Then, an image in the stripe region is captured by scanning the inspection stripe 20 with the inspection light for each inspection stripe 20. Therefore, the non-inspection region 14 located between the inspection regions 12*a* and 12*b* is also scanned with the inspection light. It is noted that, in the case of capturing an image, the autofocus mechanism 131 described above is used to perform autofocus control and capture an image.

Here, in the first embodiment, as illustrated in FIG. 4, the target object to be inspected 101 having a large step formed between the surface of the inspection region 12 and the surface of the non-inspection region 14 is used. The example of FIG. 4 shows a state in which the pattern formation surface of the target object to be inspected 101 faces downwards. In the example of FIG. 4, a pattern of the target object to be inspected 101 is formed on a glass substrate 16 with a light shielding film 17 such as chromium (Cr). Furthermore, a light shielding film 18 of, for example, chromium (Cr) or the like having a film thickness different from that of the light shielding film 17 is formed around a region where the pattern is formed (here, the inspection region 12). As described above, for example, a mask or the like in which a large step is formed by two films having different film thicknesses is used as the target object to be inspected 101. In the example of FIG. 4, a case in which the light shielding film 18 protrudes (has a large film thickness) to the outside (lower side in FIG. 4) more than the light shielding film 17 is illustrated, but the present invention is not limited thereto. For example, the thickness of the glass substrate 16 in the non-inspection region 14 may be reduced to form a target object to be inspected having a large step formed between the surface of the inspection region 12 and the surface of the non-inspection region 14.

In a comparative example of the first embodiment, when the target object to be inspected 101 is scanned, as illustrated in FIG. 4, the autofocus mechanism 131 adjusts the surface of the inspection region 12 to the focus height position on the surface of the inspection region 12, and adjusts the surface of the non-inspection region 14 to the focus height position on the surface of the non-inspection region 14. In the technique of the comparative example, when the scanning position of the inspection light enters the inspection region 12 from the non-inspection region 14, the autofocus control cannot follow the scanning position due to a large step therebetween, and the focus control may not be performed in time. As a result, in the image captured immediately after the scanning position enters the inspection region 12, the focus position is not aligned, and the image is blurred. Such a focus shift phenomenon occurs when the scanning position enters the inspection region 12 of the target inspection stripe 20 from the non-inspection region 14 on the outside of each inspection stripe 20, which is an approach section of the scanning operation. Similarly, this phenomenon occurs when the scanning position enters the next inspection region 12 adjacent to the target inspection stripe 20 in the scanning direction from the non-inspection region 14 interposed between the inspection regions 12 in each inspection stripe 20.

Therefore, in the first embodiment, when the scanning position enters the inspection region 12 from the non-inspection region 14, the height of the XYθ table 102 is adjusted in advance to the height position of the XYθ table 102 (stage) at which the height position of the inspection region surface serving as an entry destination substantially matches the focus height position, or the height position of the XYθ table 102 that can be followed by autofocus control. Hereinafter, a specific description will be given.

Figure 5:
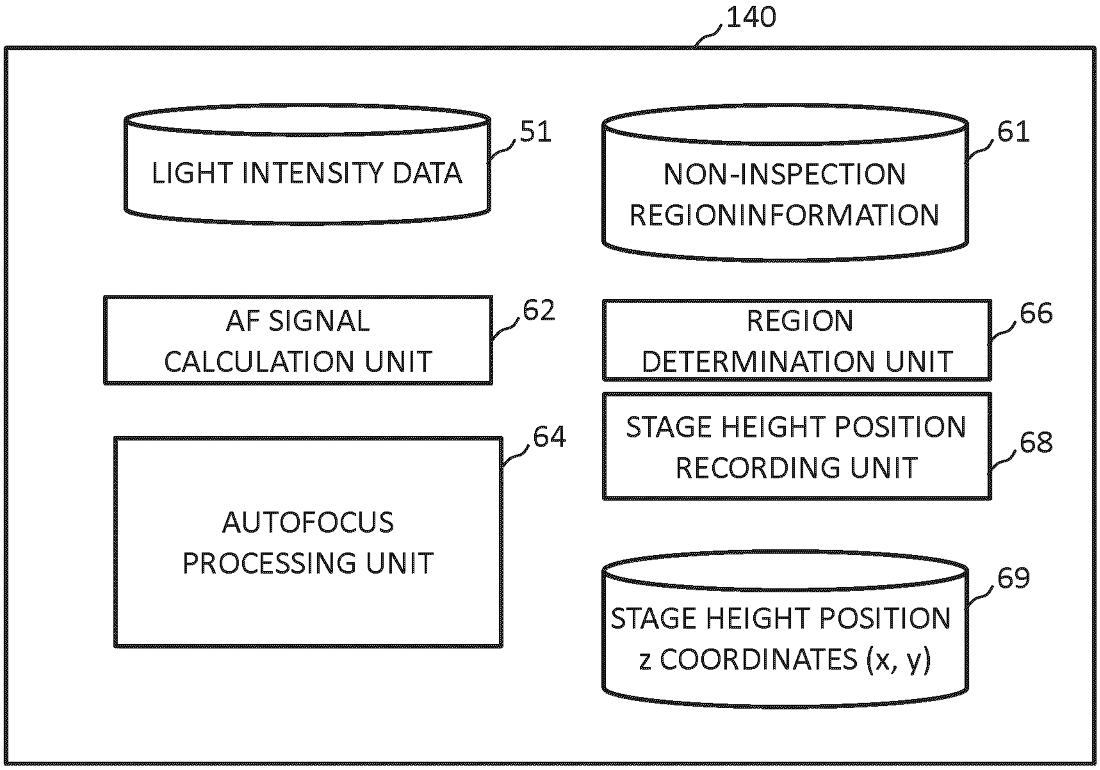
FIG. 5 is a block diagram illustrating an example of an internal configuration of an autofocus control circuit according to the first embodiment.

FIG. 5 is a block diagram illustrating an example of an internal configuration of an autofocus control circuit according to the first embodiment; In the autofocus control circuit 140, storage devices 51, 61, and 69 such as magnetic disk drives, an AF signal calculation unit 62, the autofocus processing unit 64, a region determination unit 66, and a stage height position recording unit 68 are disposed. A series of “units” such as the AF signal calculation unit 62, the autofocus processing unit 64, the region determination unit 66, and the stage height position recording unit 68 includes a processing circuit. Such a processing circuit includes an electric circuit, a computer, a processor, a circuit board, a quantum circuit, a semiconductor device, or the like. In addition, each “unit” may use a common processing circuit (the same processing circuit). Alternatively, different processing circuits (separate processing circuits) may be used. Input data necessary for the AF signal calculation unit 62, the autofocus processing unit 64, the region determination unit 66, and the stage height position recording unit 68 or results of calculation are stored in a memory (not illustrated) in the comparison circuit 108 or the memory 111 each time.

Figure 6:
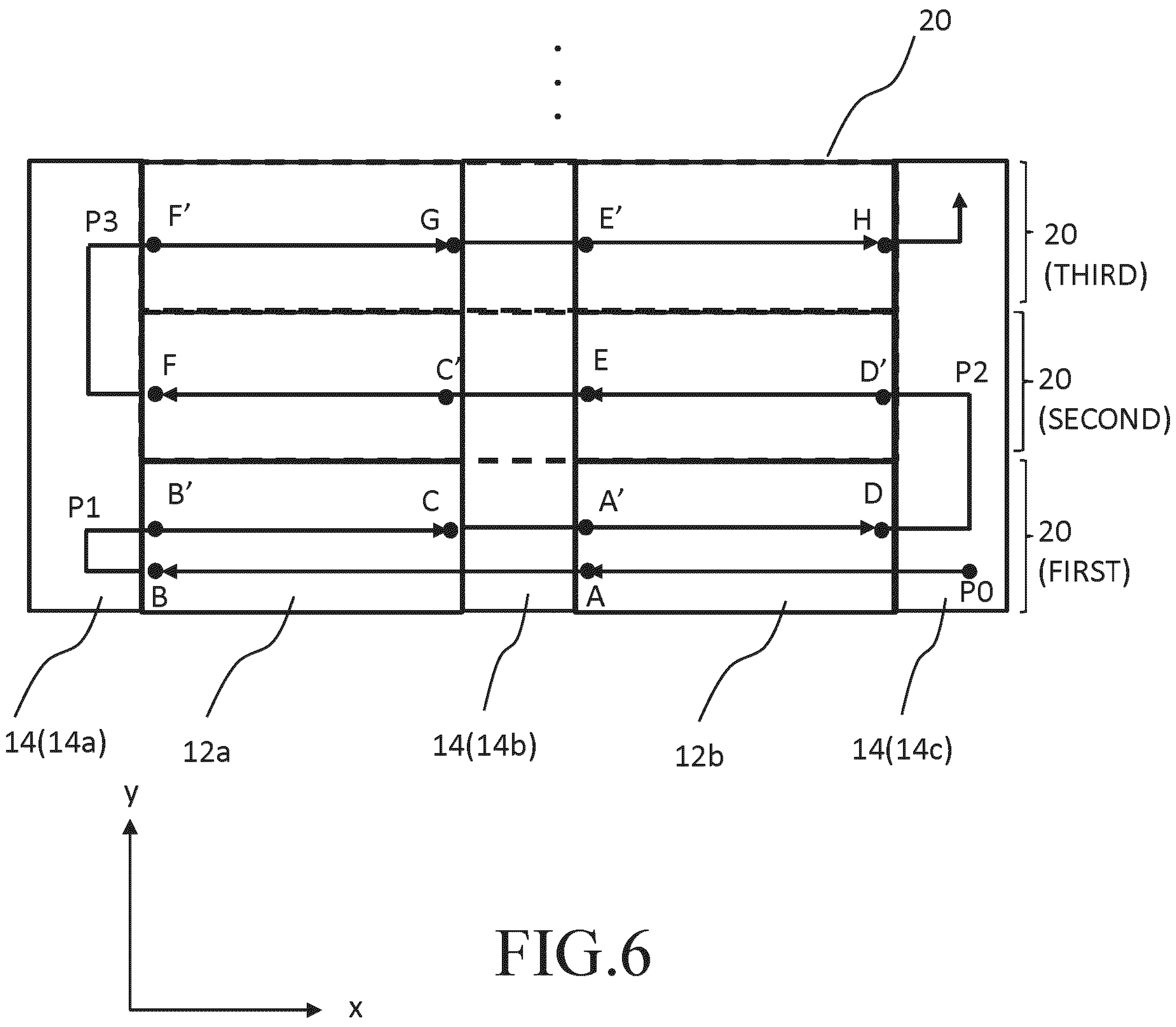
FIG. 6 is a diagram illustrating a part of a stripe region according to the first embodiment.

FIG. 6 is a diagram illustrating a part of a stripe region according to the first embodiment; The first embodiment uses the target object to be inspected 101 including a plurality of inspection regions 12*a* and 12*b* each having a figure pattern formed therein and the non-inspection region 14 interposed between the inspection regions of the plurality of inspection regions 12*a* and 12*b*. In the example of FIG. 6, among the plurality of inspection stripes 20 of the target object to be inspected 101, first to third inspection stripes 20 and non-inspection region portions on the opposite sides thereof are illustrated. In FIG. 6, y coordinates of positions P0, A, and B and y coordinates of positions P1, B', C, A', and D are shifted from each other for easy understanding of the scanning course, but the y coordinates of the positions P0, A, A', B, B', P1, C, and D are the same.

First, the target object to be inspected 101 including the plurality of inspection regions 12 each having the figure pattern formed therein and the non-inspection region 14 interposed between the inspection regions of the plurality of inspection regions 12 is placed on the movable XYθ table 102.

When acquiring an image of each inspection stripe 20, the optical image acquisition mechanism 150 scans the plurality of inspection regions 12*a* and 12*b* and the non-inspection region 14 interposed between the inspection regions in a predetermined direction with the inspection light. In the example of FIG. 6, in the first inspection stripe 20, for example, scanning is performed in the +x direction. In such a case, in the second inspection stripe 20, scanning is performed in the −x direction. In the third inspection stripe 20, scanning is performed in the +x direction. Thereafter, similarly, scanning is performed while the directions are alternately changed.

When each inspection stripe 20 is scanned, the non-inspection region 14 before the scanning start position of each inspection stripe 20 in the scanning direction is set as an approach area, the XYθ table 102 (stage) speed is accelerated up to a desired speed in the approach area, and scanning is started. Then, the scanning is continued without decreasing the stage speed until entering the non-inspection region 14 ahead of the scanning end position of each inspection stripe 20 in the scanning direction is completed, and then the XYθ table 102 (stage) speed is decelerated in the non-inspection region 14 with the non-inspection region 14 as a deceleration area. As a result, the stage speed in each inspection stripe 20 can be made constant during scanning.

When each of the inspection regions 12a and 12b is scanned with the inspection light, the autofocus mechanism 131 variably controls the height position of the XYθ table 102 (stage) on which the target object to be inspected 101 is placed, thereby performing autofocus control so as to adjust the height position of the surface of the target object to be inspected 101 (for example, the pattern formation surface) to a desired focus height position at each position of the inspection region 12a (12b). The desired focus height position is a height position at which the above-described autofocus signal has a predetermined value (for example, zero).

On the other hand, when the non-inspection region 14 is scanned with the inspection light, the autofocus mechanism 131 uses the height position z of the XYθ table 102 (stage) at which the pattern formation surface becomes the focus height position at a position in a vicinity of the scanning start position of the inspection region 12a (12b) adjacent to the end of the non-inspection region 14 in the scanning direction so as to hold the stage height position during the scanning of the non-inspection region 14 at the stage height position z at which the pattern formation surface becomes the focus height position at the position in the vicinity. Then, the autofocus control is stopped in the held state.

When the inspection region 12a(12b) adjacent to the end of the non-inspection region 14 in the scanning direction is scanned with the inspection light, the autofocus mechanism 131 variably controls the height position of the XYθ table 102 (stage) starting from the held stage height position of the XYθ table 102 (stage) so as to perform the autofocus control of adjusting the height position of the pattern formation surface of the inspection region 12a (12b) adjacent to the end of the non-inspection region in the scanning direction to the focus height position.

While each inspection stripe 20 is scanned, the region determination unit 66 inputs coordinates (x, y) of the scanning position from the position circuit 107. Then, the region determination unit 66 determines a relative positional relationship between the current scanning position and the non-inspection region 14 with reference to non-inspection region information. As the non-inspection region information, the position, size, and the like of the non-inspection region 14 are defined. The non-inspection region information is stored in advance in the storage device 61. Hereinafter, a specific description will be given.

First, before performing scanning of the first inspection stripe 20 (first scanning), the optical image acquisition mechanism 150 scans the first inspection stripe 20 (first scanning region) in a direction (−x direction) opposite the first scanning direction (+x direction) (preliminary scanning). At this time, for example, scanning is started from the position P0 in a non-inspection region 14c on the front side of the first inspection stripe 20 in the scanning direction (−x direction) of the scanning. The autofocus processing unit 64 executes autofocus control.

The region determination unit 66 outputs, at a timing when the scanning of the inspection region 12b progresses and the scanning position has reached the position A disposed immediately before a non-inspection region 14b, an identifier indicating the above-described state at the timing to the stage height position recording unit 68. A distance from an end of the non-inspection region 14b to the position A disposed immediately before the non-inspection region 14b may be set to a desired distance in advance.

The stage height position recording unit 68 records the height position z of the XYθ table 102 (stage) at the timing when the scanning position has reached the position A disposed immediately before the non-inspection region 14b (at the time when the identifier is input), and stores the height position z in the storage device 69 in association with the coordinates (x, y) of the position A.

Similarly, the region determination unit 66 outputs, at a timing when the scanning of the inspection region 12a progresses and the scanning position has reached the position B disposed immediately before a non-inspection region 14a, an identifier indicating the above-described state at the timing to the stage height position recording unit 68. A distance from an end of the non-inspection region 14a to the position B disposed immediately before the non-inspection region 14a may be set to a desired distance in advance.

The stage height position recording unit 68 records the height position z of the XYθ table 102 (stage) at the timing when the scanning position has reached the position B disposed immediately before the non-inspection region 14a (at the time when the identifier is input), and stores the height position z in the storage device 69 in association with the coordinates (x, y) of the position B.

The autofocus processing unit 64 stops the autofocus control in a state of holding the height position z of the XYθ table 102 (stage) at the position B.

Thereafter, scanning of the first inspection stripe 20 (first scanning) is performed. The optical image acquisition mechanism 150 scans the first inspection stripe 20 (first scanning region) in the first scanning direction (+x direction). At this time, for example, scanning is started from the position P1 in the non-inspection region 14a on the front side of the first inspection stripe 20 in the scanning direction (+x direction) of the scanning.

The region determination unit 66 outputs, at a timing when the scanning position has entered the inspection region 12a from the non-inspection region 14a in the scanning of the first inspection stripe 20 (first scanning), a command indicating the above-described state at the timing to the autofocus processing unit 64.

The autofocus processing unit 64 executes autofocus control starting from the XYθ table 102 (stage) height position at which the height position of the stage is held at the timing when the scanning position has entered the inspection region 12a from the non-inspection region 14a. The position B' (the same as the position B) at which the scanning position has entered the inspection region 12a is the start position of the autofocus control, and when the scanning position has reached the position B', the XYθ table 102 (stage) height position becomes the height position at which the autofocus control has been performed at the position B. Therefore, it is possible to prevent the autofocus control from being unable to follow the scanning position and being delayed. Then, the autofocus processing unit 64 performs the autofocus control on the inspection region 12a.

The region determination unit 66 outputs, at a timing when the scanning of the inspection region 12a progresses in the scanning of the first inspection stripe 20 (first scanning) and the scanning position has reached the position C disposed immediately before the non-inspection region 14b, an identifier indicating the above-described state at the timing to the stage height position recording unit 68. A distance from an end of the non-inspection region 14b to the position C disposed immediately before non-inspection region 14b may be set to a desired distance in advance.

The stage height position recording unit 68 records the height position z of the XYθ table 102 (stage) at the timing when the scanning position has reached the position C disposed immediately before the non-inspection region 14*b* (at the time when the identifier is input), and stores the height position z in the storage device 69 in association with the coordinates (x, y) of the position C.

In the scanning of the first inspection stripe 20 (first scanning), the autofocus processing unit 64 controls the drive mechanism 132 at a timing when the scanning position is switched from the inspection region 12*a* on the front side of the first inspection stripe 20 in the scanning direction (+x direction) to the non-inspection region 14*b*, and moves the height position of the XYθ table 102 (stage) to the XYθ table 102 (stage) height position z stored with respect to the position A' (same as the position A) immediately after the scanning position is switched from the non-inspection region 14*b* to the inspection region 12*b* adjacent to the end of the first inspection stripe 20 in the scanning direction (+x direction). Then, the autofocus processing unit 64 stops the autofocus control in a state of holding the moved XYθ table 102 (stage) height position z.

Then, the region determination unit 66 outputs, at a timing when the scanning position has entered the inspection region 12*b* from the non-inspection region 14*b* in the scanning of the first inspection stripe 20 (first scanning), a command indicating the above-described state at the timing to the autofocus processing unit 64.

The autofocus processing unit 64 executes autofocus control starting from the XYθ table 102 (stage) height position at which the height position of the stage is held at the timing when the scanning position has entered the inspection region 12*b* from the non-inspection region 14*b*. The position A' (the same as the position A) at which the scanning position has entered the inspection region 12*b* is the start position of the autofocus control, and when the scanning position has reached the position A', the XYθ table 102 (stage) height position becomes the height position at which the autofocus control has been performed at the position A. Therefore, it is possible to prevent the autofocus control from being unable to follow the scanning position and being delayed. Then, the autofocus processing unit 64 performs the autofocus control on the inspection region 12*b*.

The region determination unit 66 outputs, at a timing when the scanning of the inspection region 12*b* progresses in the scanning of the first inspection stripe 20 (first scanning) and the scanning position has reached the position D disposed immediately before the non-inspection region 14*c*, an identifier indicating the above-described state at the timing to the stage height position recording unit 68. A distance from an end of the non-inspection region 14*c* to the position D disposed immediately before non-inspection region 14*c* may be set to a desired distance in advance.

The stage height position recording unit 68 records the height position z of the XYθ table 102 (stage) at the timing when the scanning position has reached the position D disposed immediately before the non-inspection region 14*c* (at the time when the identifier is input), and stores the height position z in the storage device 69 in association with the coordinates (x, y) of the position D.

In the scanning of the first inspection stripe 20 (first scanning), the autofocus processing unit 64 controls the drive mechanism 132 at the timing when the scanning position is switched from the inspection region 12*b* on the front side of the first inspection stripe 20 in the scanning direction (+x direction) to the non-inspection region 14*c*, and moves the height position of the XYθ table 102 (stage) to the XYθ table 102 (stage) height position z stored with respect to the position D in the vicinity of a position D' immediately after the scanning position is switched from the non-inspection region 14*c* to the inspection region 12*b* adjacent to the end of the second inspection stripe 20 in the scanning direction (−x direction). Then, the autofocus processing unit 64 stops the autofocus control in a state of holding the moved XYθ table 102 (stage) height position z. In other words, the autofocus processing unit 64 stops the autofocus control in a state of holding the height position z of the XYθ table 102 (stage) at the position D.

As described above, the scanning of the plurality of inspection regions 12*a* and 12*b* and the non-inspection region 14 interposed between the inspection regions 12*a* and 12*b* in the +x direction (first direction) and the scanning of the plurality of inspection regions 12*a* and 12*b* and the non-inspection region 14 interposed between the inspection regions 12*a* and 12*b* in the direction opposite the x direction (−x direction) are alternately repeated while shifting the positions in the y direction (second direction) orthogonal to the +x direction.

When scanning ((n−1)th scanning) of the (n−1)th inspection stripe 20 (n is an integer of 2 or more) is performed, the stage height position recording unit 68 stores the stage height position subjected to the autofocus control immediately before the scanning position is switched from the inspection region 12*a* (12*b*) on the front side in the (n−1)th scanning direction to the non-inspection region 14*b*. As described above, in the scanning of the first inspection stripe 20 (first scanning), the autofocus-controlled stage height positions of the positions C and D are stored. Thereafter, similarly, in scanning of each stripe region, the stage height position subjected to the autofocus control immediately before the scanning position is switched from the inspection region 12*a* (12*b*) on the front side in the scanning direction to the non-inspection region 14*b* is stored.

Then, in the case of performing the nth scanning in which the scanning direction is opposite the (n−1)th scanning, at a timing when the scanning position is switched from the inspection region 12*a* (12*b*) on the front side in the nth scanning direction to the non-inspection region 14*b*, the height position of the stage is moved to the stage height position at the position stored when the (n−1)th scanning corresponding to the position in the vicinity of the position immediately after the scanning position is switched from the non-inspection region 14*b* to the inspection region 12*b* (12*a*) adjacent to the end of the non-inspection region in the nth scanning direction is performed. Hereinafter, a specific description will be given.

The scanning of the second inspection stripe 20 (second scanning) is performed. The optical image acquisition mechanism 150 scans the second inspection stripe 20 (second scanning region) in the second scanning direction (−x direction). At this time, for example, scanning is started from a position P2 in the non-inspection region 14*c* on the front side of the second inspection stripe 20 in the scanning direction (−x direction) of the scanning.

The region determination unit 66 outputs, at a timing when the scanning position has entered the inspection region 12*b* from the non-inspection region 14*c* in the scanning of the second inspection stripe 20 (second scanning), a command indicating the above-described state at the timing to the autofocus processing unit 64.

The autofocus processing unit 64 executes autofocus control starting from the XYθ table 102 (stage) height position at which the height position of the stage is held at the timing when the scanning position has entered the inspection region 12*b* from the non-inspection region 14*c*. The position D' at which the scanning position has entered the inspection region 12*b* is the start position of the autofocus control, and when the scanning position has reached the position D', the XYθ table 102 (stage) height position becomes the height position at which the autofocus control has been performed at the position D in the vicinity of the position D'. Therefore, it is possible to prevent the autofocus control from being unable to follow the scanning position and being delayed. Then, the autofocus processing unit 64 performs the autofocus control on the inspection region 12*b*.

The region determination unit 66 outputs, at a timing when the scanning of the inspection region 12*b* progresses in the scanning of the second inspection stripe 20 (second scanning) and the scanning position has reached a position E disposed immediately before the non-inspection region 14*b*, an identifier indicating the above-described state at the timing to the stage height position recording unit 68. A distance from an end of the non-inspection region 14*b* to the position E disposed immediately before the non-inspection region 14*b* may be set in the same manner as the distance from the end of the non-inspection region 14*b* to the position A.

The stage height position recording unit 68 records the height position z of the XYθ table 102 (stage) at the timing when the scanning position has reached the position E disposed immediately before the non-inspection region 14*b* (at the time when the identifier is input), and stores the height position z in the storage device 69 in association with the coordinates (x, y) of the position E.

In the scanning of the second inspection stripe 20 (second scanning), the autofocus processing unit 64 controls the drive mechanism 132 at the timing when the scanning position is switched from the inspection region 12*b* on the front side of the second inspection stripe 20 in the scanning direction (−x direction) to the non-inspection region 14*b*, and moves the height position of the XYθ table 102 (stage) to the XYθ table 102 (stage) height position z stored with respect to the position C in the vicinity of a position C' immediately after the scanning position is switched from the non-inspection region 14*b* to the inspection region 12*a* adjacent to the end of the second inspection stripe 20 in the scanning direction (−x direction). Then, the autofocus processing unit 64 stops the autofocus control in a state of holding the moved XYθ table 102 (stage) height position z.

Then, the region determination unit 66 outputs, at a timing when the scanning position has entered the inspection region 12*a* from the non-inspection region 14*b* in the scanning of the second inspection stripe 20 (second scanning), a command indicating the above-described state at the timing to the autofocus processing unit 64.

The autofocus processing unit 64 executes autofocus control starting from the XYθ table 102 (stage) height position at which the height position of the stage is held at the timing when the scanning position has entered the inspection region 12*a* from the non-inspection region 14*b*. The position C' at which the scanning position has entered the inspection region 12*a* is the start position of the autofocus control, and when the scanning position has reached the position C', the XYθ table 102 (stage) height position becomes the height position at which the autofocus control has been performed at the position C in the vicinity of the position C'. Therefore, it is possible to prevent the autofocus control from being unable to follow the scanning position and being delayed. Then, the autofocus processing unit 64 performs the autofocus control on the inspection region 12*b*.

The region determination unit 66 outputs, at a timing when the scanning of the inspection region 12*a* progresses in the scanning of the second inspection stripe 20 (second scanning) and the scanning position has reached a position F disposed immediately before the non-inspection region 14*a*, an identifier indicating the above-described state at the timing to the stage height position recording unit 68. A distance from an end of the non-inspection region 14*a* to the position F disposed immediately before the non-inspection region 14*a* may be the same as the distance from the end of the non-inspection region 14*a* to the position B disposed immediately before the non-inspection region 14*a*.

The stage height position recording unit 68 records the height position z of the XYθ table 102 (stage) at the timing when the scanning position has reached the position F disposed immediately before the non-inspection region 14*a* (at the time when the identifier is input), and stores the height position z in the storage device 69 in association with the coordinates (x, y) of the position F.

In the scanning of the second inspection stripe 20 (second scanning), the autofocus processing unit 64 controls the drive mechanism 132 at the timing when the scanning position is switched from the inspection region 12*a* on the front side of the second inspection stripe 20 in the scanning direction (−x direction) to the non-inspection region 14*a*, and moves the height position of the XYθ table 102 (stage) to the XYθ table 102 (stage) height position z stored with respect to the position F in the vicinity of a position F' immediately after the scanning position is switched from the non-inspection region 14*a* to the inspection region 12*a* adjacent to the end of the third inspection stripe 20 in the scanning direction (+x direction). Then, the autofocus processing unit 64 stops the autofocus control in a state of holding the moved XYθ table 102 (stage) height position z. In other words, the autofocus processing unit 64 stops the autofocus control in a state of holding the height position z of the XYθ table 102 (stage) at the position F.

The scanning of the third inspection stripe 20 (third scanning) is performed. The optical image acquisition mechanism 150 scans the third inspection stripe 20 (third scanning region) in the third scanning direction (+x direction). At this time, for example, scanning is started from a position P3 in the non-inspection region 14*a* on the front side of the third inspection stripe 20 in the scanning direction (+x direction) of the scanning.

The region determination unit 66 outputs, at a timing when the scanning position has entered the inspection region 12*a* from the non-inspection region 14*a* in the scanning of the third inspection stripe 20 (third scanning), a command indicating the above-described state at the timing to the autofocus processing unit 64.

The autofocus processing unit 64 executes autofocus control starting from the XYθ table 102 (stage) height position at which the height position of the stage is held at the timing when the scanning position has entered the inspection region 12*a* from the non-inspection region 14*a*. The position F' at which the scanning position has entered the inspection region 12*a* is the start position of the autofocus control, and when the scanning position has reached the position F', the XYθ table 102 (stage) height position becomes the height position at which the autofocus control has been performed at the position F in the vicinity of the position F'. Therefore, it is possible to prevent the autofocus control from being unable to follow the scanning position and being delayed. Then, the autofocus processing unit 64 performs the autofocus control on the inspection region 12*a*.

The region determination unit 66 outputs, at a timing when the scanning of the inspection region 12*a* progresses in the scanning of the third inspection stripe 20 (third scanning) and the scanning position has reached a position G disposed immediately before the non-inspection region 14*b*, an identifier indicating the above-described state at the timing to the stage height position recording unit 68. A distance from an end of the non-inspection region 14*b* to the position G disposed immediately before the non-inspection region 14*b* may be set in the same manner as the distance from the end of the non-inspection region 14*b* to the position C.

The stage height position recording unit 68 records the height position z of the XYθ table 102 (stage) at the timing when the scanning position has reached the position G disposed immediately before the non-inspection region 14*b* (at the time when the identifier is input), and stores the height position z in the storage device 69 in association with the coordinates (x, y) of the position G.

In the scanning of the third inspection stripe 20 (third scanning), the autofocus processing unit 64 controls the drive mechanism 132 at the timing when the scanning position is switched from the inspection region 12*a* on the front side of the third inspection stripe 20 in the scanning direction (+x direction) to the non-inspection region 14*b*, and moves the height position of the XYθ table 102 (stage) to the XYθ table 102 (stage) height position z stored with respect to the position E in the vicinity of a position E' immediately after the scanning position is switched from the non-inspection region 14*b* to the inspection region 12*b* adjacent to the end of the third inspection stripe 20 in the scanning direction (+x direction). Then, the autofocus processing unit 64 stops the autofocus control in a state of holding the moved XYθ table 102 (stage) height position z.

Then, the region determination unit 66 outputs, at a timing when the scanning position has entered the inspection region 12*b* from the non-inspection region 14*b* in the scanning of the third inspection stripe 20 (third scanning), a command indicating the above-described state at the timing to the autofocus processing unit 64.

The autofocus processing unit 64 executes autofocus control starting from the XYθ table 102 (stage) height position at which the height position of the stage is held at the timing when the scanning position has entered the inspection region 12*b* from the non-inspection region 14*b*. The position E' at which the scanning position has entered the inspection region 12*b* is the start position of the autofocus control, and when the scanning position has reached the position E', the XYθ table 102 (stage) height position becomes the height position at which the autofocus control has been performed at the position E in the vicinity of the position E'. Therefore, it is possible to prevent the autofocus control from being unable to follow the scanning position and being delayed. Then, the autofocus processing unit 64 performs the autofocus control on the inspection region 12*b*.

The region determination unit 66 outputs, at a timing when the scanning of the inspection region 12*b* progresses in the scanning of the third inspection stripe 20 (third scanning) and the scanning position has reached a position H disposed immediately before the non-inspection region 14*c*, an identifier indicating the above-described state at the timing to the stage height position recording unit 68. A distance from an end of the non-inspection region 14*c* to the position H disposed immediately before the non-inspection region 14*c* may be the same as the distance from the end of the non-inspection region 14*c* to the position D disposed immediately before the non-inspection region 14*c*.

The stage height position recording unit 68 records the height position z of the XYθ table 102 (stage) at the timing when the scanning position has reached the position H disposed immediately before the non-inspection region 14*c* (at the time when the identifier is input), and stores the height position z in the storage device 69 in association with the coordinates (x, y) of the position H.

In the scanning of the third inspection stripe 20 (third scanning), the autofocus processing unit 64 controls the drive mechanism 132 at the timing when the scanning position is switched from the inspection region 12*b* on the front side of the third inspection stripe 20 in the scanning direction (+x direction) to the non-inspection region 14*c*, and moves the height position of the XYθ table 102 (stage) to the XYθ table 102 (stage) height position z stored with respect to the position H in the vicinity of a position immediately after the scanning position is switched from the non-inspection region 14*c* to the inspection region 12*b* adjacent to the end of the fourth inspection stripe 20 in the scanning direction (−x direction). Then, the autofocus processing unit 64 stops the autofocus control in a state of holding the moved XYθ table 102 (stage) height position z. In other words, the autofocus processing unit 64 stops the autofocus control in a state of holding the height position z of the XYθ table 102 (stage) at the position F.

Thereafter, scanning of each inspection stripe 20 is similarly repeated.

As described above, in the target object to be inspected 101 in which the plurality of inspection regions are arranged with the non-inspection region interposed therebetween in the scanning direction at the time of inspection, when the target object to be inspected 101 supported by method of three-point support or four or more-point support is deflected, the focus height position immediately before switching from the inspection region 12*a* (12*b*) to the non-inspection region 14*b* and the focus height position immediately after switching from the non-inspection region 14*b* to the next inspection region 12*b* (12*a*) do not necessarily coincide with each other. Therefore, simply stopping the autofocus mechanism immediately before the scanning position enters the non-inspection regions 14*a*, 14*b*, and 14*c* may not solve the problem that an image captured immediately after the scanning position enters the next inspection region 12*a* (12*b*) is blurred.

On the other hand, according to the first embodiment, before the scanning position is switched to the inspection region 12*a* (12*b*) adjacent to the end in the scanning direction, the height position is moved to the XYθ table 102 (stage) height position z stored with respect to the position (the position on the previous adjacent stripe region) in the vicinity of the position immediately after the scanning position is switched to the inspection region 12*a* (12*b*) adjacent to the end in the scanning direction.

As a result, it is possible to prevent the autofocus control from being unable to follow the scanning position and being delayed. Further, with respect to the scanning start position of the first inspection region of each inspection stripe 20, since the stage height position at the scanning end position of the last inspection region of the immediately preceding adjacent inspection stripe 20 is held, it is possible to prevent the autofocus control from being unable to follow the scanning position and being delayed.

Figure 7:
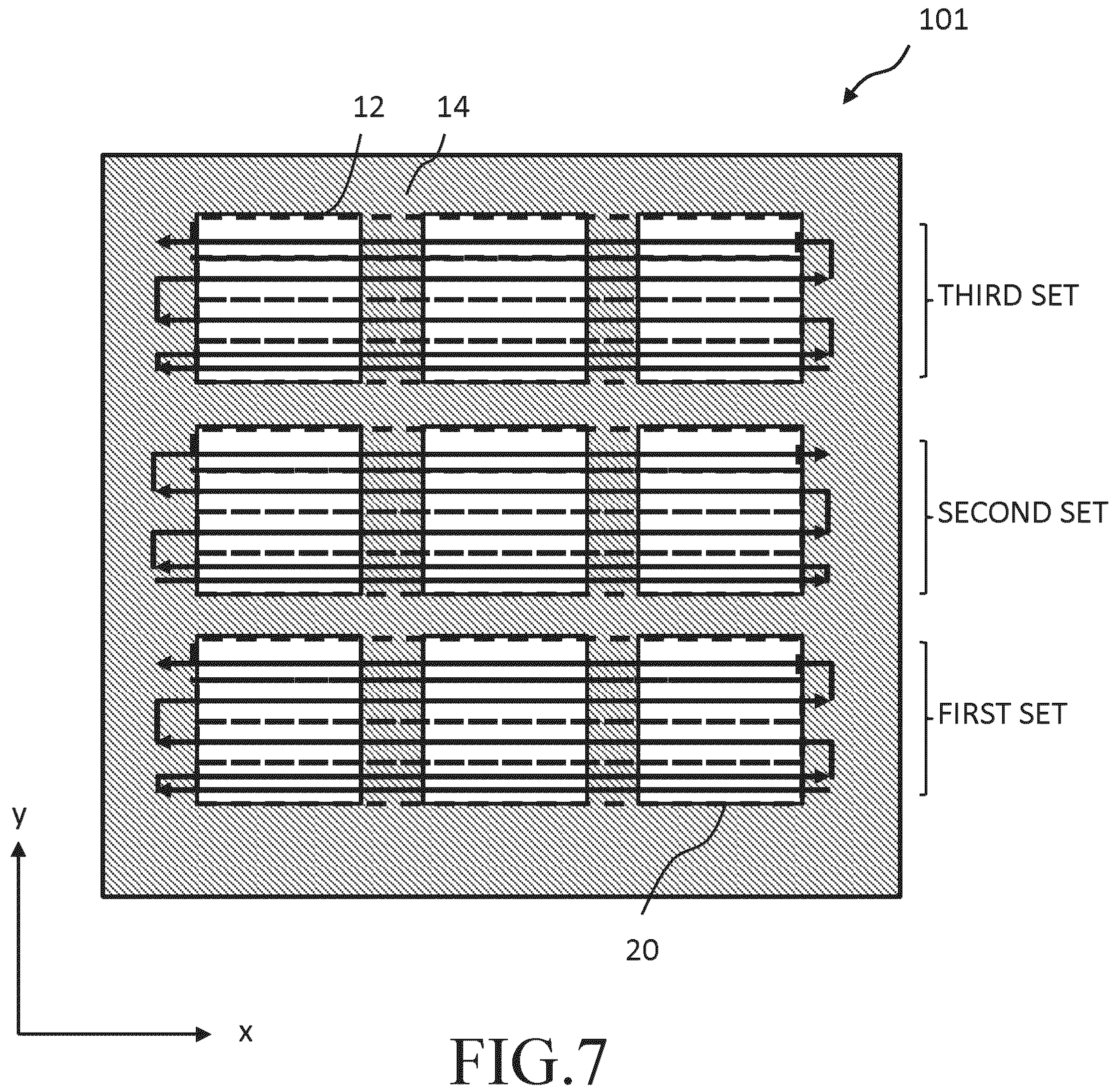
FIG. 7 is a top view illustrating another example of the target object to be inspected according to the first embodiment.

FIG. 7 is a top view illustrating another example of the mask according to the first embodiment.

In the example of FIG. 7, a case in which two or more non-inspection regions are sandwiched between the inspection regions in each inspection stripe 20 is illustrated. In such a case as well, when each inspection stripe 20 is scanned, as in the case described above, the height position z of the XYθ table 102 (stage) is recorded at a timing when the scanning position reaches a position disposed immediately before the non-inspection region 14 when each non-inspection region is crossed. Then, the scanning position is moved to the XYθ table 102 (stage) height position z stored with respect to a position in the vicinity of a position immediately after the scanning position is switched from the non-inspection region 14 to the inspection region 12 adjacent to the end in the scanning direction (position on the previous adjacent stripe region). Then, the autofocus processing unit 64 stops the autofocus control in a state of holding the moved XYθ table 102 (stage) height position z. Then, autofocus control is executed starting from the XYθ table 102 (stage) height position at which the height position of the stage is held at a timing when the scanning position has entered the inspection region 12 from the non-inspection region 14.

As described above, it is possible to prevent the autofocus control from being unable to follow the scanning position and being delayed.

Further, in the example of FIG. 7, the target object to be inspected 101 includes a first set and a second set in the y direction (second direction) of the first set with the non-inspection region 14 interposed therebetween, the first set including the plurality of inspection regions 12 and the non-inspection region 14 interposed between the plurality of inspection regions 12, the second set including the plurality of inspection regions 12 and the non-inspection region 14 between the plurality of inspection regions 12. The example of FIG. 7 illustrates a case in which a third set including the plurality of inspection regions 12 and the non-inspection region 14 interposed between the plurality of inspection regions is provided with the non-inspection region 14 further interposed in the y direction of the second set. As the scanning of each inspection stripe 20 progresses in this manner, the non-inspection region 14 may be interposed between the next stripe region of next set and the inspection stripe of this set. In such a case, it is preferable to perform an operation as follows. Each inspection stripe 20 may be set for each set. However, the present invention is not limited thereto, and a circumscribed rectangular region of each set including the non-inspection region 14 interposed between the sets in the y direction may be divided into a plurality of inspection stripes 20.

When the non-inspection region 14 is interposed between the sets, a distance is too far to set a position in the final inspection stripe 20 of the current set to a position near a position immediately after switching from a non-inspection region to an inspection region of the first inspection stripe 20 of the next set. Therefore, in the first embodiment, when each inspection stripe 20 is scanned on the target object to be inspected 101, it is preferable to perform an operation as follows.

When scanning of the second set is performed subsequent to scanning of the first set, the first scanning region of the second set is scanned in a direction opposite the first scanning direction for the second set before the scanning of the second set is performed. For example, when the scanning direction of final inspection stripes 20 of the first set is, for example, the −x direction, as preliminary scanning, the first inspection stripes 20 of the second set is scanned in the x direction prior to performing the scanning of first inspection stripes 20 of the second set, as illustrated in FIG. 7. At that time, scanning is started from a position in the non-inspection region 14 on the front side of the first inspection stripe 20 of the second set in the scanning direction (+x direction) of the preliminary scanning. The autofocus processing unit 64 executes autofocus control.

It is noted that, in such a case, the scanning direction in the scanning of the first inspection stripe 20 of the second set is the −x direction, which is the opposite direction of the preliminary scanning.

Then, the stage height position at which autofocus control is performed immediately before the scanning position is switched from the previous inspection region 12 to the non-inspection region 14 in the direction (+x direction) opposite the first scanning direction of the second set is stored. Hereinafter, a specific description will be given.

The region determination unit 66 outputs, at a timing when the scanning of the inspection region 12 progresses and the scanning position has reached a position disposed immediately before the non-inspection region 14 located in the middle of the inspection stripe 20, an identifier indicating the above-described state at the timing to the stage height position recording unit 68.

The stage height position recording unit 68 records the height position z of the XYθ table 102 (stage) at the timing when the scanning position has reached the position disposed immediately before the non-inspection region 14 (at the time when the identifier is input), and stores the height position z in the storage device 69 in association with the coordinates (x, y) of the position disposed immediately before the non-inspection region 14.

Similarly, the region determination unit 66 outputs, at a timing when the scanning of the inspection region 12 progresses and the scanning position has reached a position disposed immediately before the last non-inspection region of the inspection stripe 20, an identifier indicating the above-described state at the timing to the stage height position recording unit 68.

The stage height position recording unit 68 records the height position z of the XYθ table 102 (stage) at the timing when the scanning position has reached the position disposed immediately before the last non-inspection region 14 (at the time when the identifier is input) of the inspection stripe 20, and stores the height position z in the storage device 69 in association with the coordinates (x, y) of the position.

The autofocus processing unit 64 stops the autofocus control in a state of holding the height position z of the XYθ table 102 (stage) at the position disposed immediately before the last non-inspection region 14 of the inspection stripe 20.

Then, the first inspection stripe 20 of the second set is scanned (first scanning). The optical image acquisition mechanism 150 scans the first inspection stripe 20 of the second set in the first scanning direction (−x direction) of the second set. At that time, scanning is started from a position in the non-inspection region 14 on the front side of the first inspection stripe 20 of the second set in the scanning direction (−x direction) of the scanning.

The region determination unit 66 outputs, at a timing when the scanning position has entered the inspection region 12 from the non-inspection region 14 in the scanning (first scanning) of the first inspection stripe 20 of the second set, a command indicating the above-described state at the timing to the autofocus processing unit 64.

The autofocus processing unit 64 executes autofocus control starting from the XYθ table 102 (stage) height position at which the height position of the stage is held at the timing when the scanning position has entered the inspection region 12 from the non-inspection region 14. When the scanning position enters the inspection region 12, the XYθ table 102 (stage) height position becomes the height position at which autofocus control has been performed at the position by the preliminary scanning. Therefore, it is possible to prevent the autofocus control from being unable to follow the scanning position and being delayed. Then, the autofocus processing unit 64 performs the autofocus control on the inspection region 12.

Thereafter, the operation is similar to the scanning of the first inspection stripe 20 of the first set. At this time, at the timing when the scanning position is switched from the inspection region on the front side of the first inspection stripe 20 of the second set in the −x direction which is the scanning direction (first scanning direction) to the non-inspection region located in the middle of the first inspection stripe 20, the stage height position is moved to the stage height position stored in the preliminary scanning with respect to the position immediately after the scanning position is switched from the non-inspection region located in the middle of the first inspection stripe 20 to the inspection region adjacent to the end of the first inspection stripe 20 of the second set in the scanning direction. Hereinafter, a specific description will be given.

The region determination unit 66 outputs, at a timing when the scanning of the inspection region 12 progresses in the scanning (first scanning) of the first inspection stripe 20 of the second set and the scanning position has reached a position disposed immediately before the non-inspection region 14 located in the middle of the first inspection stripe 20 of the second set, an identifier indicating the above-described state at the timing to the stage height position recording unit 68.

The stage height position recording unit 68 records the height position z of the XYθ table 102 (stage) at the timing when the scanning position has reached the position disposed immediately before the non-inspection region 14 located in the middle of the first inspection stripe 20 of the second set (the time point when the identifier is input), and stores the height position z in the storage device 69 in association with the coordinates (x, y) of the position.

In the scanning of the first inspection stripe 20 of the second set (first scanning), the autofocus processing unit 64 controls the drive mechanism 132 at a timing when the scanning position is switched from the inspection region 12 on the front side of the first inspection stripe 20 of the second set in the scanning direction (+x direction) to the non-inspection region 14 located in the middle of the first inspection stripe 20 of the second set, and moves the height position of the XYθ table 102 (stage) to the XYθ table 102 (stage) height position z stored in the preliminary scanning with respect to the position immediately after the scanning position is switched from the non-inspection region 14 to the inspection region 12 adjacent to the end of the first inspection stripe 20 in the scanning direction (−x direction). Then, the autofocus processing unit 64 stops the autofocus control in a state of holding the moved XYθ table 102 (stage) height position z.

Then, the region determination unit 66 outputs, at a timing when the scanning position has entered the inspection region 12 from the non-inspection region 14 located in the middle of the first inspection stripe 20 in the scanning (first scanning) of the first inspection stripe 20 of the second set, a command indicating the above-described state to the autofocus processing unit 64.

The autofocus processing unit 64 executes autofocus control starting from the XYθ table 102 (stage) height position at which the height position of the stage is held at a timing when the scanning position has entered the next inspection region 12 from the non-inspection region 14 located in the middle of the first inspection stripe 20. When the scanning position has entered the inspection region 12 (the same as the position stored in the preliminary scanning), the XYθ table 102 (stage) height position becomes the height position at which the autofocus control is performed at the position stored in the preliminary scanning. Therefore, it is possible to prevent the autofocus control from being unable to follow the scanning position and being delayed. Then, the autofocus processing unit 64 performs the autofocus control on the inspection region 12.

As described above, in a case where the non-inspection region is interposed between the sets, the shift of the focus height position can be suppressed or reduced by performing preliminary scanning before scanning of the first inspection stripe 20 is performed for each set.

Here, in the above-described example, the timing at which the XYθ table 102 (stage) height position is moved to the XYθ table 102 (stage) height position z stored with respect to the position in the vicinity of the position immediately after the scanning position is switched from the non-inspection region 14 to the inspection region 12 adjacent to the end in the scanning direction is exemplified as a timing at which the scanning position is switched from the inspection region 12 on the front side in the scanning direction to the non-inspection region 14. The timing at which the scanning position is switched from the inspection region 12 on the front side in the scanning direction to the non-inspection region 14 may be the following timing in addition to the timing immediately after the switching from the inspection region 12 on the front side thereof in the scanning direction to the non-inspection region 14. For example, at a timing when the position immediately before the switching from the inspection region 12 on the front side in the scanning direction to the non-inspection region 14 is reached, the timing following the storage processing of the height position z of the XYθ table 102 (stage) at that position is also suitable.

Alternatively, as a timing of moving the XYθ table 102 (stage) height position to the XYθ table 102 (stage) height position z stored with respect to the position in the vicinity of the position immediately after the scanning position is switched from the non-inspection region 14 to the inspection region 12 adjacent to the end in the scanning direction, it is also suitable within a period after the scanning position is switched from the inspection region 12 to the non-inspection region 14 and before the scanning position is switched to the inspection region 12 adjacent to the end in the scanning direction.

The reference image generation circuit 112 generates a reference image to be a reference using figure pattern data (design data). The reference image is generated for each inspection stripe 20 in parallel with the scanning operation (scanning operation) of the inspection stripe 20. Specifically, an operation is performed as follows. The reference image generation circuit 112 inputs the figure pattern data (design data) for each frame region 30 of the target inspection stripe 20, and converts each figure pattern defined in the figure pattern data into binary or multi-valued image data.

The figure defined in the figure pattern data is, for example, a rectangle or a triangle as a basic figure, and for example, figure data in which the shape, size, position, and the like of each pattern figure are defined by information such as coordinates (x, y) at a reference position of the figure, a length of a side, and a figure code serving as an identifier to distinguish a figure type such as a rectangle or a triangle is stored.

When the design pattern data to be the figure data is input to the reference image generation circuit 112, the design pattern data is expanded to data for each figure, and a figure code indicating a figure shape of the figure data, a figure dimension, and the like are interpreted. Then, the design pattern data is expanded into binary or multi-valued design pattern image data as a pattern arranged in a square having a grid of a predetermined quantization dimension as a unit, and is output. In other words, the design data is read, an occupancy rate of the figure in the design pattern is calculated for each square formed by virtually dividing a frame region as a square having a predetermined dimension as a unit, and n-bit occupancy data (design image data) is output. For example, it is preferable to set one square as one pixel. Then, assuming that one pixel has a resolution of $\frac{1}{2}^{8}$ (=1/256), a small region of 1/256 is allocated by regions of figures arranged in the pixel, and an occupancy rate in the pixel is calculated. Then, it is generated as 8-bit occupancy rate data. The square (inspection pixel) may be matched with a pixel of measurement data.

Next, the reference image generation circuit 112 performs filter processing on design image data of a design pattern, which is image data of a figure, using a filter function.

Figure 8:
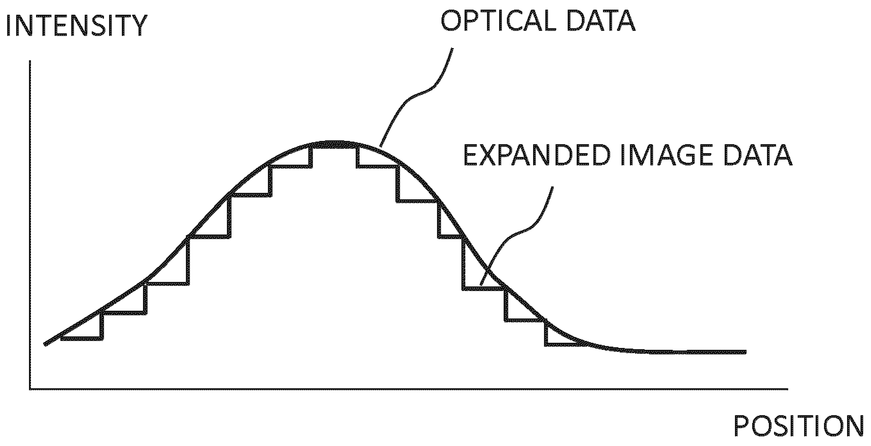
FIG. 8 is a diagram illustrating filter processing according to the first embodiment.

FIG. 8 is a diagram illustrating filter processing according to the first embodiment; and Since pixel data of an optical image captured from the target object to be inspected 101 is in a state in which a filter acts due to resolution characteristics of an optical system used for imaging or the like, in other words, in an analog state in which an image intensity (gray value) is continuously changed, for example, as illustrated in FIG. 8, the image intensity (gray value) is different from an expanded image (design image) of a digital value. On the other hand, since the figure pattern data is defined by the figure code or the like as described above, the image intensity (gray value) may be a digital value in the expanded design image. Therefore, the reference image generation circuit 112 performs image processing (filter processing) on the expanded image to generate a reference image close to an optical image. As a result, design image data, which is image data on the design side in which the image intensity (gray value) is a digital value, can be matched with image generation characteristics of the measurement data (optical image). The generated reference image is output to the comparison circuit 108.

Figure 9:
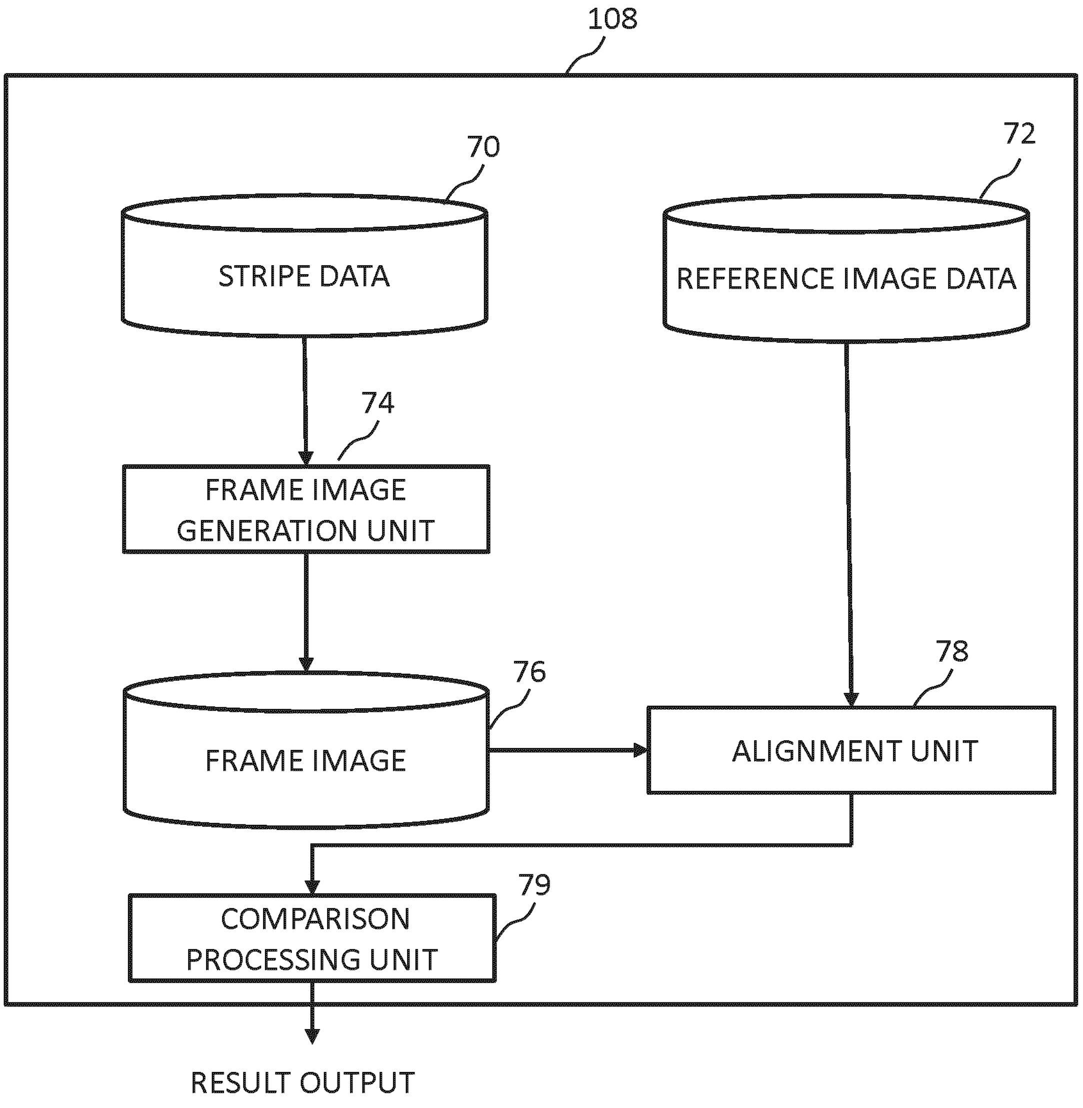
FIG. 9 is a diagram illustrating an example of an internal configuration of a comparison circuit according to the first embodiment.

FIG. 9 is a diagram illustrating an example of an internal configuration of a comparison circuit according to the first embodiment. In FIG. 9, storage devices 70, 72, and 76 such as magnetic disk drive, a frame image generation unit 74, an alignment unit 78, and a comparison processing unit 79 are arranged in the comparison circuit 108. A series of "units" such as the frame image generation unit 74, the alignment unit 78, and the comparison processing unit 79 includes a processing circuit. Such a processing circuit includes an electric circuit, a computer, a processor, a circuit board, a quantum circuit, a semiconductor device, or the like. In addition, each "unit" may use a common processing circuit (the same processing circuit). Alternatively, different processing circuits (separate processing circuits) may be used. Input data necessary for the frame image generation unit 74, the alignment unit 78, and the comparison processing unit 79 or a calculated result is stored in a memory (not illustrated) in the comparison circuit 108 or the memory 111 each time.

Stripe data (stripe region image) input to the comparison circuit 108 is stored in the storage device 70. The reference image data input to the comparison circuit 108 is stored in the storage device 72.

The comparison circuit 108 (an example of a comparison unit) compares a captured optical image with a reference image using the reference image, and outputs a result. Specifically, an operation is performed as follows.

In the comparison circuit 108, first, the frame image generation unit 74 generates a plurality of frame images 31 obtained by dividing a stripe region image (optical image) by a predetermined width. Specifically, as illustrated in FIG. 2, the stripe region image is divided into frame images of a plurality of rectangular frame regions 30. For example, the frame image 31 is divided into a size of 512×512 pixels. The data of each frame region 30 is stored in the storage device 76.

Next, the alignment unit 78 reads the corresponding frame image 31 and the corresponding reference image from the storage devices 72 and 76 for each frame region 30, and aligns the frame image 31 and the corresponding reference image by a predetermined algorithm. For example, the alignment is performed using a least squares method.

Then, the comparison processing unit 79 (another example of the comparison unit) compares the frame image 31 with the reference image corresponding to the frame image 31. For example, comparison is performed for each pixel. Here, the two are compared for each pixel according to a predetermined determination condition, and for example, the presence or absence of a defect such as a shape defect is determined. As a determination condition, for example, the two are compared for each pixel according to a predetermined algorithm so as to determine the presence or absence of a defect. For example, a difference value between pixel values of both images is calculated for each pixel, and a case in which the difference value is larger than a threshold value Th is determined as a defect. Then, the comparison result may be output to, for example, the magnetic disk drive 109, the magnetic tape device 115, the flexible disk device (FD) 116, the CRT 117, or the pattern monitor 118, or may be output from the printer 119.

In the above-described example, the case of the die-database inspection has been described, but die-die inspection may be used. In such a case, the comparison circuit 108 uses the frame image (optical image) of a die 2 acquired for one region of the frame regions as a reference (reference image) for the frame regions to be subjected to the die-die inspection among the plurality of frame regions 30. First, the alignment unit 78 reads the frame image 31 of a corresponding die 1 and the frame image of the die 2 from the storage device 76 for each frame region 30 in which the die-die inspection is performed, and aligns the frame image 31 of the die 1 and the frame image of the die 2 by a predetermined algorithm. For example, the alignment is performed using a least squares method. Then, the comparison processing unit 79 (comparison unit) compares the frame image 31 of the corresponding die 1 with the frame image of the die 2 for each pixel for each frame region 30 in which the die-die inspection is performed.

As described above, according to the first embodiment, in the inspection of the target object to be inspected 101 in which the plurality of inspection regions 12 are arranged with the non-inspection region 14 interposed therebetween, even when a large step that an autofocus mechanism hardly follows is formed between the inspection region 12 and the non-inspection region 14, it is possible to suppress or reduce blurring of an image captured immediately after the scanning position enters the inspection region 12.

The embodiments have been described above with reference to specific examples. However, the present invention is not limited to these specific examples.

In addition, although descriptions of parts and the like that are not directly necessary for the description of the present invention, such as a device configuration and a control method, are omitted, a required device configuration and control method can be appropriately selected and used. For example, a description of a controller configuration for controlling the inspection apparatus 100 is omitted, but it goes without saying that a necessary controller configuration is appropriately selected and used.

In addition, all pattern inspection methods and pattern inspection apparatuses that include the elements of the present invention and can be appropriately changed in design by those skilled in the art are included in the scope of the present invention.

Additional advantages and modification will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pattern inspection method comprising:

scanning, with inspection light, a plurality of inspection regions and a non-inspection region interposed between the plurality of inspection regions in a predetermined direction using a target object to be inspected, the target object being an exposure mask for semiconductor manufacturing and including the plurality of inspection regions each having a figure pattern formed therein and the non-inspection region interposed between the plurality of inspection regions;

capturing an optical image of the target object to be inspected by receiving, using a sensor through an inspection optical system, a light transmitted through or reflected by the target object to be inspected irradiated with the inspection light; and comparing, using a reference image, a captured optical image with the reference image and outputting a comparison result, wherein the scanning includes:

performing, when an inspection region, of the plurality of inspection regions, on a front side of the non-inspection region in a scanning direction is scanned with the inspection light, autofocus control of variably controlling a height position of a stage on which the target object to be inspected placed thereon so as to adjust a height position of a pattern formation surface to a desired focus height position at each position of the inspection region;

holding, by using a stage height at which a pattern formation surface becomes a focus height position at a position near a scanning start position of an inspection region, of the plurality of inspection regions, adjacent to an end of the non-inspection region between the plurality of inspection regions in the scanning direction, a stage height position during scanning of the non-inspection region at the stage height at which the pattern formation surface becomes the focus height position at the position near the scanning start position when the non-inspection region is scanned with the inspection light; and performing, when the inspection region adjacent to the end of the non-inspection region in the scanning direction is scanned with the inspection light, autofocus control of adjusting a height position of the pattern formation surface of the inspection region adjacent to the end of the non-inspection region in the scanning direction to the focus height position by starting the height position of the stage from the held stage height position and variably controlling the height position of the stage.

2. The method according to claim 1, wherein scanning of the plurality of inspection regions and the non-inspection region interposed between the plurality of inspection regions in a first direction and scanning of the plurality of inspection regions and the non-inspection region interposed between the plurality of inspection regions in a direction opposite the first direction are alternately repeated while a position is shifted in a second direction orthogonal to the first direction, and wherein the scanning further includes:

storing, when (n−1)th scanning (n is an integer of 2 or more) is performed, the stage height position subjected to the autofocus control immediately before a scanning position is switched from an inspection region, of the plurality of inspection regions, on a front side of the non-inspection region in an (n−1)th scanning direction to the non-inspection region; and moving, when (n)th scanning is performed in a scanning direction opposite the (n−1)th scanning, the height position of the stage to a stage height position stored when the (n−1)th scanning is performed, corresponding to the stage height position of a position near a position immediately after the scanning position is switched from the non-inspection region to an inspection region, of the plurality of inspection regions, adjacent to an end of the non-inspection region in an (n)th scanning direction, at a timing when the scanning position is switched from the inspection region on the front side of the non-inspection region to the non-inspection region in the (n)th scanning direction.

3. The method according to claim 2, wherein the scanning further includes:

scanning, before first scanning is performed, a first scanning region in a direction opposite a first scanning direction, and storing a stage height position subjected to the autofocus control immediately before the scanning position is switched from an inspection region, of the plurality of inspection regions, on the front side of the non-inspection region to the non-inspection region in the direction opposite the first scanning direction; and moving, when the first scanning is performed, the height position of the stage to a stage height position stored with respect to a position immediately after the scanning position is switched from the non-inspection region to an inspection region, of the plurality of inspection regions, adjacent to the end of the non-inspection region in the first scanning direction at a timing when the scanning position is switched from the inspection region on the front side of the non-inspection region to the non-inspection region in the first scanning direction.

4. The method according to claim 2, wherein the target object to be inspected includes a first set and a second set in the second direction of the first set with a non-inspection region interposed therebetween, the first set including the plurality of inspection regions and the non-inspection region interposed between the plurality of inspection regions, the second set including the plurality of inspection regions and the non-inspection region interposed between the plurality of inspection regions, and wherein the scanning further includes:

scanning, when scanning of the second set is continuously performed after scanning of the first set is performed, a first scanning region of the second set in a direction opposite a first scanning direction of the second set before the scanning of the second set is performed, and storing a stage height position subjected to the autofocus control immediately before the scanning position is switched from an inspection region, of the plurality of inspection regions of the second set, on the front side of the non-inspection region of the second set to the non-inspection region of the second set in the direction opposite the first scanning direction of the second set; and moving, when the first scanning of the second set is performed, the stage height position to the stage height position stored with respect to a position immediately after the scanning position is switched from the non-inspection region of the second set to an inspection region, of the plurality of inspection regions of the second set, adjacent to an end of the non-inspection region of the second set in the first scanning direction at a timing when the scanning position is switched from the inspection region on the front side of the non-inspection region to the non-inspection region in the first scanning direction of the second set.

5. A pattern inspection apparatus comprising:

a movable stage configured to allow a target object to be inspected to be placed thereon, the target object being an exposure mask for semiconductor manufacturing and including a plurality of inspection regions each having a figure pattern formed thereon and a non-inspection region interposed between the plurality of inspection regions;

a drive mechanism configured to move a height position of the stage;

an illumination optical system configured to illuminate the target object to be inspected with an inspection light;

a sensor configured to capture an optical image of the target object to be inspected by receiving a light transmitted through or reflected by the target object to be inspected irradiated with the inspection light:

an inspection optical system configured to guide the light transmitted through or reflected by the target object to be inspected to the sensor;

an autofocus mechanism configured to perform, when the plurality of inspection regions and the non-inspection region interposed between the plurality of inspection regions are scanned with the inspection light in a predetermined direction, autofocus control of variably controlling a height position of the stage so as to adjust a height position of a pattern formation surface to a desired focus height position at each position of the plurality of inspection regions; and a comparison circuit configured to compare, using a reference image, a captured optical image with the reference image, wherein the autofocus mechanism includes:

a storage device configured to store a stage height at which the pattern formation surface becomes the focus height position at a position near a scanning start position of an inspection region, of the plurality of inspection regions, adjacent to an end of the non-inspection region in a scanning direction; and an autofocus processing circuit configured to hold, when the non-inspection region is scanned with the inspection light, a stage height position during scanning of the non-inspection region at the stage height at which the pattern formation surface becomes the focus height position at the position near the scanning start position, and to adjust, when the inspection region adjacent to the end of the non-inspection region between the plurality of inspection regions in the scanning direction is scanned with the inspection light, the height position of the pattern formation surface of the inspection region adjacent to the end of the non-inspection region in the scanning direction to a focus height position by starting the height position of the stage from a held stage height position and variably controlling the height position of the stage.

6. The apparatus according to claim 5, wherein a region obtained by combining the plurality of inspection regions and the non-inspection region interposed between the plurality of inspection regions is divided into a plurality of stripe regions in a predetermined direction, and wherein the autofocus mechanism further includes a region determination circuit configured to input coordinates of a scanning position while each of the stripe regions is scanned and to determine a relative positional relationship between a current scanning position and the non-inspection region.

7. The apparatus according to claim 6, wherein the region determination circuit is configured to determine, using non-inspection region information, the relative positional relationship between the current scanning position and the non-inspection region.

8. The apparatus according to claim 7, wherein a position and a size of the non-inspection region are defined as the non-inspection region information.

9. The apparatus according to claim 5, wherein the illumination optical system is configured to scan, before first scanning is performed, a first scanning region with the inspection light in a direction opposite a first scanning direction.

10. The apparatus according to claim 9, wherein the storage device is configured to store a stage height position subjected to autofocus control immediately before a scanning position is switched from an inspection region on a front side of the non-inspection region to the non-inspection region in the direction opposite the first scanning direction.

* * * * *